United States Patent
Matsunami et al.

(10) Patent No.: US 7,805,564 B2
(45) Date of Patent: *Sep. 28, 2010

(54) DISPLAY APPARATUS AND ITS METHOD FOR DISPLAYING CONNECTIONS AMONG A HOST, A LOGICAL UNIT AND A STORAGE SYSTEM IN A VIRTUAL STORAGE SYSTEM

(75) Inventors: Naoto Matsunami, Sagamihara (JP); Takashi Oeda, Sagamihara (JP); Akira Yamamoto, Sagamihara (JP); Yasuyuki Mimatsu, Fujisawa (JP); Masahiko Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 701 days.

This patent is subject to a terminal disclaimer.

(21) Appl. No.: 10/898,259

(22) Filed: Jul. 26, 2004

(65) Prior Publication Data

US 2005/0033914 A1 Feb. 10, 2005

Related U.S. Application Data

(60) Division of application No. 10/769,922, filed on Feb. 3, 2004, now Pat. No. 6,910,102, which is a continuation of application No. 10/405,645, filed on Apr. 3, 2003, now Pat. No. 6,851,029, which is a continuation of application No. 10/095,581, filed on Mar. 13, 2002, now Pat. No. 6,701,411, which is a continuation of application No. 09/468,327, filed on Dec. 21, 1999, now Pat. No. 6,542,961.

(30) Foreign Application Priority Data

Dec. 22, 1998 (JP) .................................. 10-364079

(51) Int. Cl.
*G06F 12/00* (2006.01)

(52) U.S. Cl. ........................ 711/114; 711/156; 711/202; 711/206; 709/224; 370/244; 715/736

(58) Field of Classification Search ......... 715/733–747; 709/224; 370/244, 363, 250–258; 711/114, 711/156, 202, 206

See application file for complete search history.

(56) References Cited

U.S. PATENT DOCUMENTS 5,140,592 A    8/1992   Idelman et al.

(Continued)

FOREIGN PATENT DOCUMENTS

AM         05-197498         6/1993

(Continued)

OTHER PUBLICATIONS

Microsoft Computer Dictionary, Forth Edition, definition of the term "node", p. 312, 1999.

(Continued)

*Primary Examiner*—Stephen C Elmore
(74) *Attorney, Agent, or Firm*—Mattingly & Malur, P.C.

(57) ABSTRACT

This invention provides a user or an operator with a management apparatus or method for displaying logical connection information between an interface connected to a computer and a switch and a storage system or a logical unit in the storage system in a virtual storage system, wherein the switch receives a first access request from said computer, converts said first access request to a second access request to one of said plural storage systems, and sends said second access request to one of said plural storage systems or one logical unit.

15 Claims, 22 Drawing Sheets

U.S. PATENT DOCUMENTS

| | | | |
|---|---|---|---|
| 5,155,835 A * | 10/1992 | Belsan | 711/114 |
| 5,193,184 A * | 3/1993 | Belsan et al. | 711/4 |
| 5,257,391 A | 10/1993 | DuLac et al. | |
| 5,293,635 A * | 3/1994 | Faulk et al. | 709/224 |
| 5,390,173 A * | 2/1995 | Spinney et al. | 370/393 |
| 5,430,855 A * | 7/1995 | Walsh et al. | 710/10 |
| 5,509,018 A * | 4/1996 | Niijima et al. | 714/710 |
| 5,517,662 A | 5/1996 | Coleman et al. | |
| 5,519,844 A | 5/1996 | Stallmo | |
| 5,559,958 A * | 9/1996 | Farrand et al. | 714/27 |
| 5,568,629 A * | 10/1996 | Gentry et al. | 711/114 |
| 5,581,735 A | 12/1996 | Kajitani et al. | |
| 5,606,359 A | 2/1997 | Youden et al. | |
| 5,619,690 A | 4/1997 | Matsumani et al. | |
| 5,729,763 A | 3/1998 | Leshem | |
| 5,745,789 A | 4/1998 | Kakuta | |
| 5,751,965 A * | 5/1998 | Mayo et al. | 709/224 |
| 5,754,791 A * | 5/1998 | Dahlgren et al. | 709/242 |
| 5,768,520 A * | 6/1998 | Dan et al. | 709/223 |
| 5,812,754 A * | 9/1998 | Lui et al. | 714/6 |
| 5,835,694 A | 11/1998 | Hodges | |
| 5,974,237 A * | 10/1999 | Shurmer et al. | 709/224 |
| 5,999,179 A * | 12/1999 | Kekic et al. | 715/734 |
| 6,009,466 A * | 12/1999 | Axberg et al. | 709/220 |
| 6,023,780 A | 2/2000 | Iwatani | |
| 6,078,990 A | 6/2000 | Frazier | |
| 6,098,119 A | 8/2000 | Surugucchi et al. | |
| 6,105,122 A | 8/2000 | Muller et al. | |
| 6,128,016 A * | 10/2000 | Coelho et al. | 715/808 |
| 6,148,349 A | 11/2000 | Chow et al. | |
| 6,173,374 B1 | 1/2001 | Heil et al. | |
| 6,209,033 B1 * | 3/2001 | Datta et al. | 709/224 |
| 6,247,077 B1 | 6/2001 | Muller et al. | |
| 6,256,740 B1 | 7/2001 | Muller et al. | |
| 6,263,374 B1 | 7/2001 | Olnowich et al. | |
| 6,289,375 B1 * | 9/2001 | Knight et al. | 709/217 |
| 6,314,460 B1 * | 11/2001 | Knight et al. | 709/220 |
| 6,329,985 B1 * | 12/2001 | Tamer et al. | 715/853 |
| 6,421,711 B1 * | 7/2002 | Blumenau et al. | 709/213 |
| 6,466,973 B2 * | 10/2002 | Jaffe | 709/223 |
| 6,484,245 B1 | 11/2002 | Sanada et al. | |
| 6,493,750 B1 | 12/2002 | Mathew et al. | |
| 6,542,961 B1 | 4/2003 | Matsunami et al. | |
| 6,664,978 B1 * | 12/2003 | Kekic et al. | 715/733 |
| 6,839,747 B1 * | 1/2005 | Blumenau et al. | 709/223 |
| 6,910,102 B2 * | 6/2005 | Matsunami et al. | 711/114 |
| 7,107,534 B1 * | 9/2006 | de Jong et al. | 715/734 |
| 2002/0002606 A1 * | 1/2002 | Jaffe | 709/223 |
| 2005/0251620 A1 * | 11/2005 | Matsunami et al. | 711/114 |

FOREIGN PATENT DOCUMENTS

| | | |
|---|---|---|
| JP | 64-008433 | 1/1989 |
| JP | 05265661 | 10/1993 |
| JP | 06-187201 | 8/1994 |
| JP | 07013917 | 1/1995 |
| JP | 08171463 | 7/1996 |
| JP | 08-328760 | 12/1996 |
| JP | 09-198308 | 7/1997 |
| JP | 09292954 | 11/1997 |
| JP | 09305328 | 11/1997 |
| JP | 10333839 | 12/1998 |

OTHER PUBLICATIONS

Serial SCSI Finally Arrives on the Market, Nikkei Electronics, No. 639, 1995, p. 79.

* cited by examiner

FIG.6A

Host-LU Configuration Table 20270

| Host-LU No. | LU Type | CLU Class | CLU Stripe Size | Condition | LU Info |||| LU Info |||| LU Info |||| LU Info |||| LU Info |||| 20271 |
| --- | --- | --- | --- | --- | --- | --- | --- | --- | --- | --- | --- | --- | --- | --- | --- | --- | --- | --- | --- | --- | --- | --- | --- | --- | --- |
| | | | | | Subset | LUN | Size | | Subset | LUN | Size | | Subset | LUN | Size | | Subset | LUN | Size | | Subset | LUN | Size | | |
| 0 | CLU | Joined | – | Normal | #0 | 0 | n0 | | #1 | 0 | n1 | | #2 | 0 | n2 | | #3 | 0 | n3 | | | | | | |
| 1 | – | – | – | Not Defined | – | – | – | | – | – | – | | – | – | – | | – | – | – | | – | – | – | | |
| 2 | – | – | – | Not Defined | – | – | – | | – | – | – | | – | – | – | | – | – | – | | – | – | – | | |
| ... | ... | ... | ... | ... | ... | ... | ... | | ... | ... | ... | | ... | ... | ... | | ... | ... | ... | | ... | ... | ... | | |

Diskarray I/F Node Configuration Table 20272

| Subset No. | Subset Port No. | Switch No | I/F Node No. |
| --- | --- | --- | --- |
| #0 | 0 | 0 | #0 |
| #0 | 1 | 1 | #0 |
| #1 | 0 | 0 | #1 |
| #1 | 1 | 1 | #1 |
| ... | ... | ... | ... |

Diskarray System Configuration Table

| R_CTL | D_ID | |
|---|---|---|
| | S_ID | |
| Type | F_CTL | |
| SEQ_ID | DF_CTL | SEQ_CNT |
| OX_ID | RX_ID | |
| | Parameters | |

401

| LUN (High) |
|---|
| LUN (Low) |
| CNTL |
| CDB (word0) |
| CDB (word1) |
| CDB (word2) |
| CDB (word3) |
| Data Lenght |

402

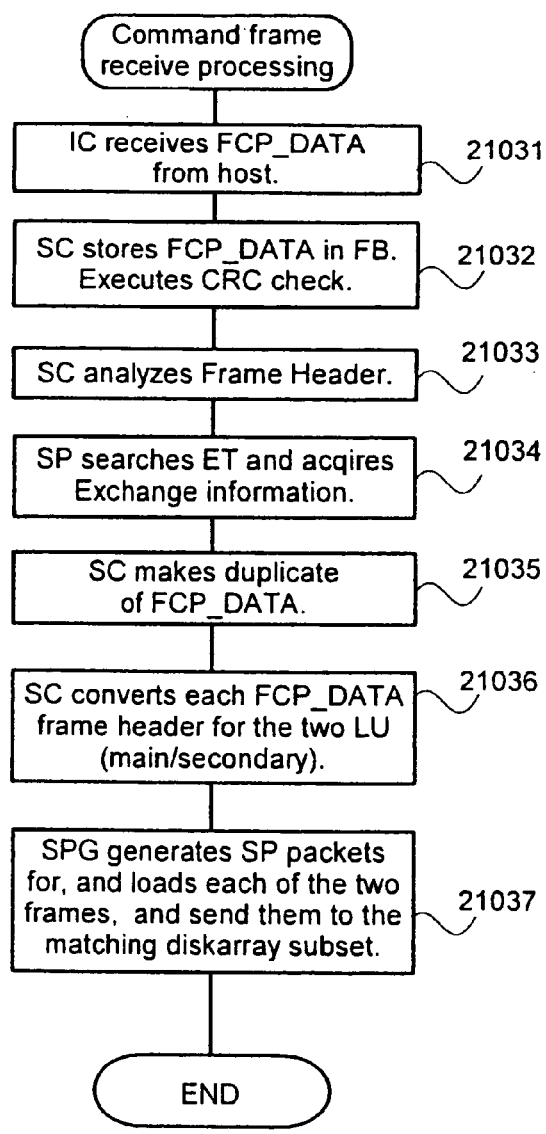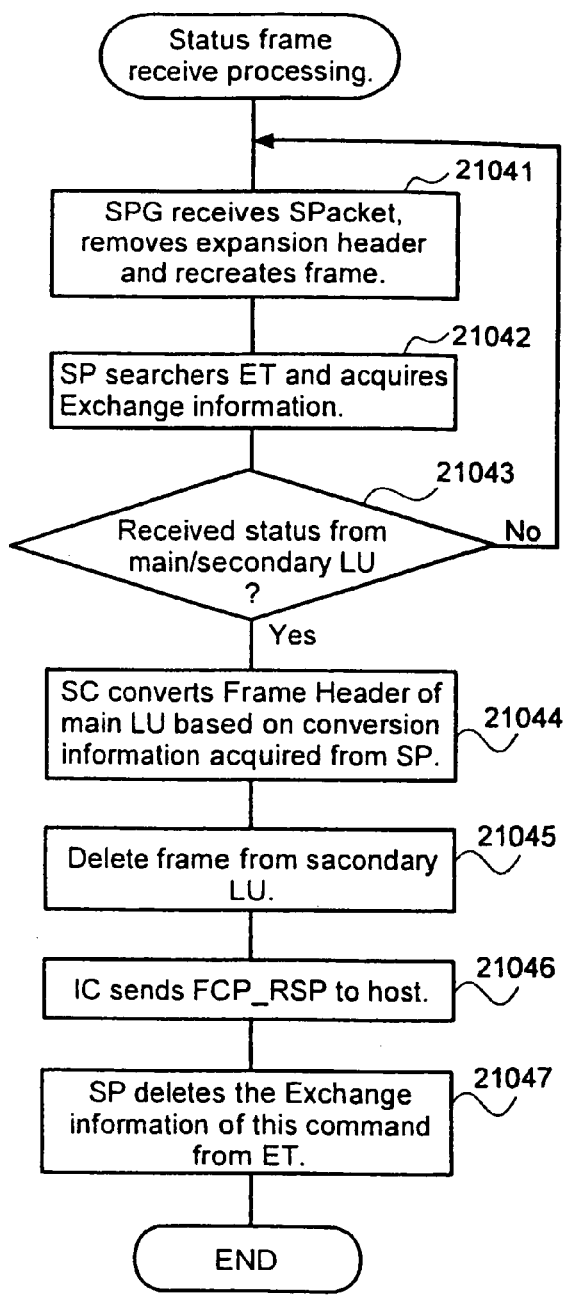

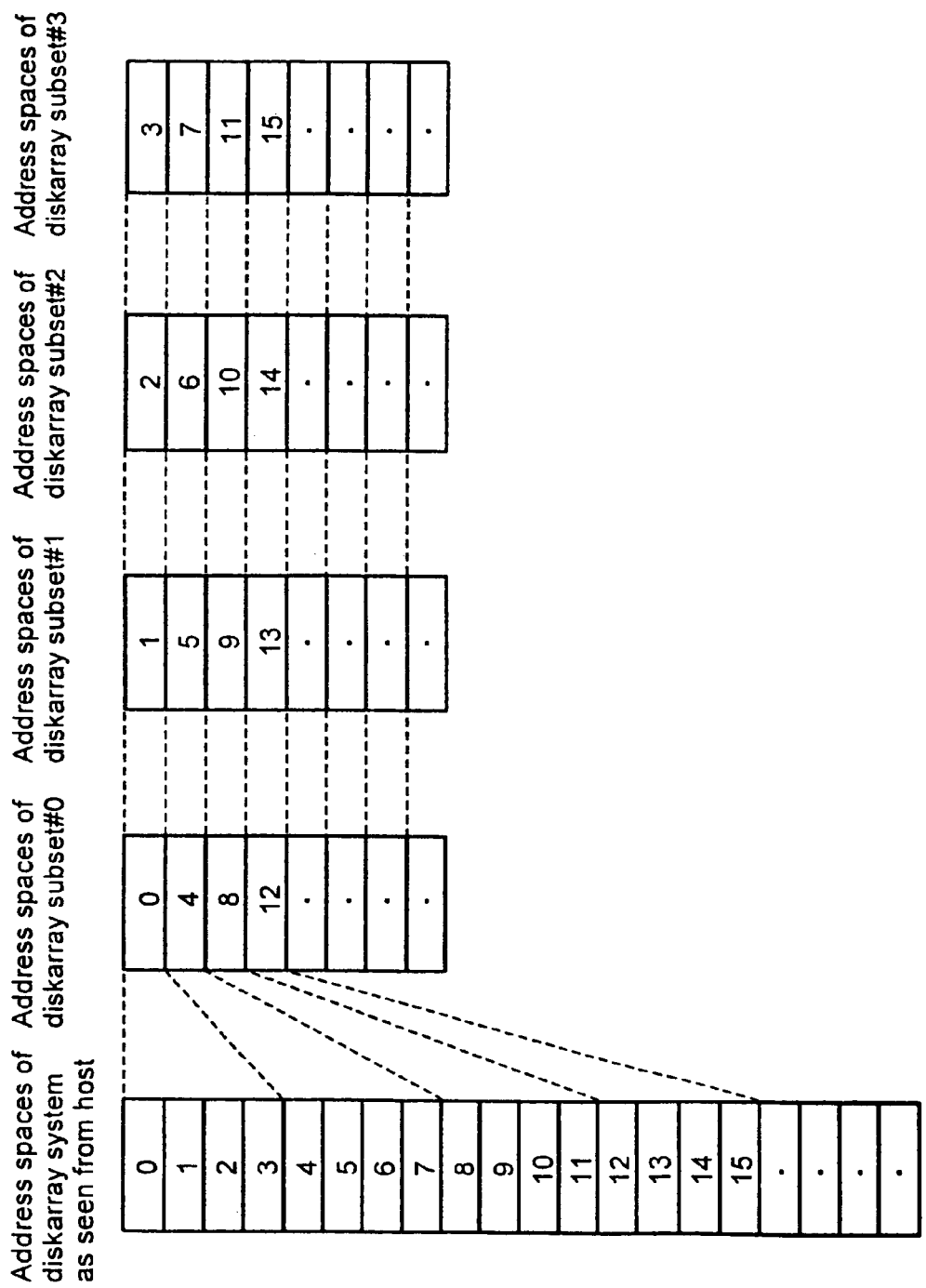

DISPLAY APPARATUS AND ITS METHOD FOR DISPLAYING CONNECTIONS AMONG A HOST, A LOGICAL UNIT AND A STORAGE SYSTEM IN A VIRTUAL STORAGE SYSTEM

This is a divisional application of U.S. Ser. No. 10/769,922, filed Feb. 3, 2004, now U.S. Pat. No. 6,910,102; which is a continuation application of U.S. Ser. No. 10/405,645, filed on Apr. 3, 2003, now U.S. Pat. No. 6,851,029; which is a continuation application of U.S. Ser. No. 10/095,581, filed Mar. 13, 2002, now U.S. Pat. No. 6,701,411; which is a continuation application of U.S. Ser. No. 09/468,327, filed on Dec. 21, 1999, now U.S. Pat. No. 6,542,961. This application is related to U.S. Ser. No. 10/095,578, filed Mar. 13, 2002.

BACKGROUND OF THE INVENTION

This invention relates to a disk control system for controlling a plurality of disk devices and relates in particular to a method for improving the high speed operation of the disk control system, achieving a lower cost and improving the cost performance.

A diskarray system for controlling a plurality of disk devices is utilized as a storage system in computers. A diskarray system is for instance disclosed in "A Case for Redundant Arrays of Inexpensive Disks (RAID)"; In Proc. ACM SIGMOD, June 1988 (Issued by Cal. State Univ. Berkeley). This diskarray operates a plurality of disk systems in parallel and is a technique that achieves high speed operation compared to storage systems utilizing disks as single devices.

A method using the fabric of a fiber channel is a technique for mutually connecting a plurality of hosts with a plurality of diskarray systems. A computer system using this technique is disclosed for instance in "Serial SCSI Finally Arrives on the Market" of Nikkei Electronics, P. 79, Jul. 3, 1995 (No. 639) as shown in FIG. 3. In the computer system disclosed here, a plurality of host computers (hereafter simply called hosts) and a plurality of diskarray systems are respectively connected to a fabric device by way of fiber channels. The fabric device is a switch for the fiber channels and performs transfer path connections between the desired devices. The fabric device is transparent to (or passes) "frame" transfers which age packets on the fiber channel. The host and diskarray system communicate between two points without recognizing the fabric device.

SUMMARY OF THE INVENTION

In diskarray systems of the conventional art, when the number of disk devices were increased in order to increase the storage capacity and achieving a controller having high performance matching the number of disk units was attempted, the internal controller buses were found to have only limited performance and likewise, the processor performing transfer control was also found to have only limited performance. In order to deal with these problems, the internal buses were expanded and the number of processors was increased. However, attempting to solve the problem in this manner made the controller structure more complex due to the control required for a greater number of buses and caused increased overhead and complicated software control due to non-exclusive control of data shared between processors, etc. The rise in cost consequently became extremely high and performance reached its limits so that cost performance was unsatisfactory. Though the cost for this kind could be justified in terms of performance in a large scale system, in systems not on such a large scale the cost did not match performance, expandability was limited and the development period and development costs increased.

The overall system storage capacity and performance can be increased by connecting a plurality of diskarray systems in parallel with a fabric device. However, in this method, there is absolutely no connection between the diskarray systems, and access concentrated on a particular diskarray system cannot be distributed among the other devices so that high performance cannot be achieved to actual operation. Also, the capacity of a logical disk device (hereafter logic unit) as seen from the host is limited to the capacity of one diskarray system so that a high capacity logic unit cannot be achieved.

In an attempt to improve diskarray system reliability, a diskarray system can be comprised of a mirror structure where, in two diskarray systems, the host unit has a mirroring function. However, this method requires overhead due to control required of the mirroring by the host and also has the problem that performance is limited. This method also increases the load that the system administrator must supervise since many diskarray systems are present inside the system. The maintenance costs thus increase since a large number of maintenance personnel must be hired and maintenance fees must be paid for each unit. The plurality of diskarray systems and fabric devices are further all autonomous devices so that the settings must be made by different methods according to the respective device, creating the problem that operating costs increase along with a large increase in operating time and system administrator training time, etc.

In order to resolve these problems with the related art, this invention has the object of providing a disk storage system capable of being structured according to the scale and requirements of the computer system, and a disk storage system that responds easily to needs for high reliability and future expansion.

The disk storage system of this invention contains a storage device having a record medium for holding the data, a plurality of storage sub-systems having a controller for controlling the storage device, a first interface node coupled to a computer using the data stored in the plurality of storage sub-systems, a plurality of second interface nodes connected to any or one of the storage sub-systems, a switch connecting between a first interface node and a plurality of second interface nodes to perform frame transfer between a first interface node and a plurality of second interface nodes based on node address information added to the frame.

The first interface node preferably has a configuration table to store structural information for the memory storage system and a processing unit to analyze the applicable frame in response to the frame sent from the computer, converts information relating to the transfer destination of that frame based on structural information held in the configuration table, and transfers that frame to the switch. Further, when transmitting a frame, the first interface node adds the node address information about the node that must receive the frame, to that frame. A second interface node then removes the node address information from the frame that was received, recreates the frame and transfers that frame to the desired storage sub-system.

In the embodiment of this invention, the disk storage system has a managing processor connecting to the switch. The managing processor sets the structural information in the configuration table of each node according to the operator's instructions. Information for limiting access from the computer is contained in this structural information.

In another embodiment of this invention, the first interface node replies to the command frame sent from the computer instructing the writing of data, makes copies of that command frame and the following data frames, adds different nodes address information to each frame so the received frame and the copied command frames will be sent to the different respective nodes and sends these frames to the switch.

BRIEF DESCRIPTION OF THE DRAWINGS

FIG. 6A is sample diskarray system configuration table.

FIGS. 20A through 20D are flowcharts showing the processing on the host I/F node during the mirroring write processing in the sixth embodiment of this invention.

FIG. 21 is an address spatial diagram of the diskarray system for the seventh embodiment of this invention.

DESCRIPTION OF THE PREFERRED EMBODIMENTS

First Embodiment

Figure 1:
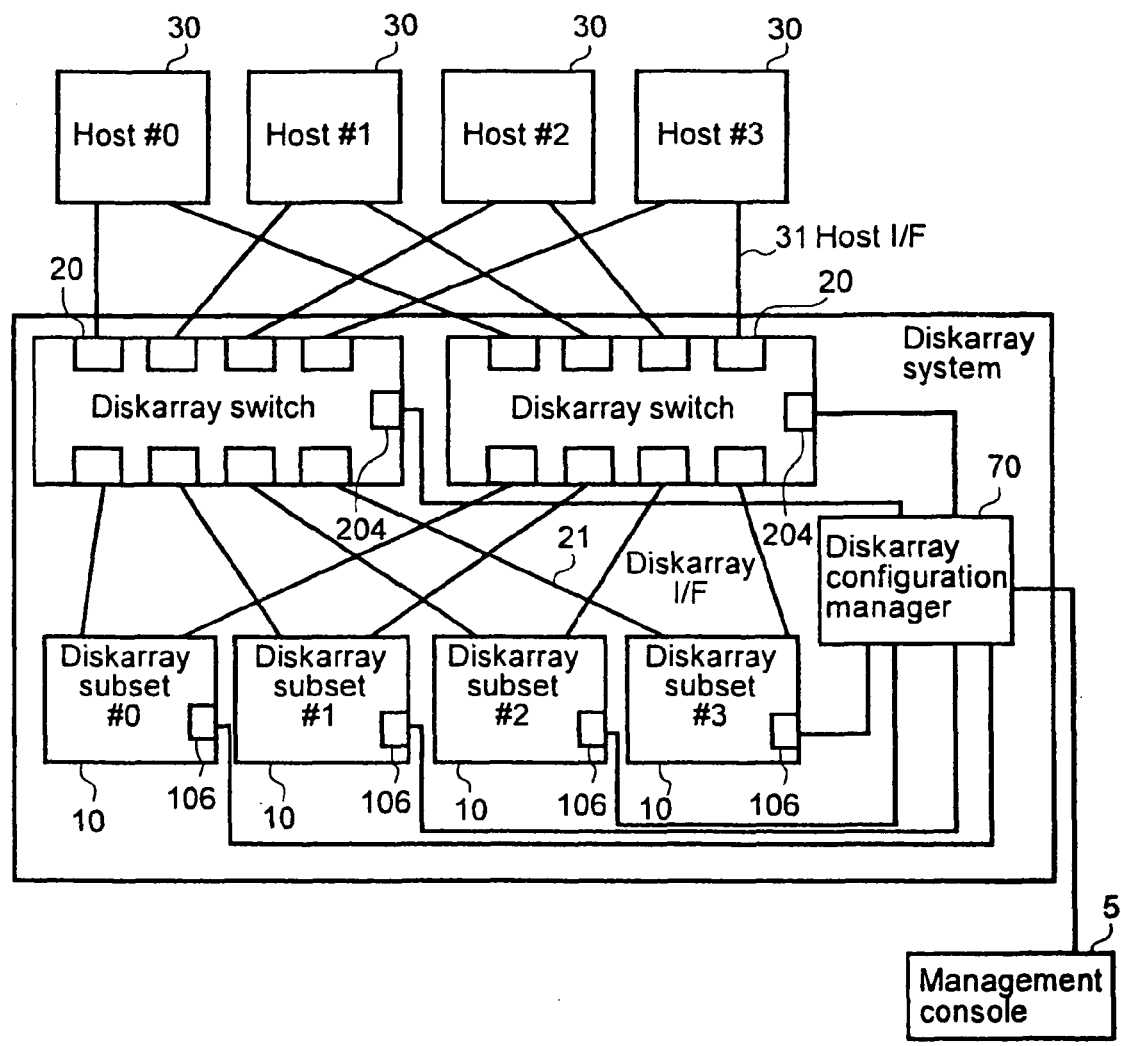
FIG. 1 is a block diagram showing the structure of the computer system of the first embodiment of this invention.

FIG. 1 is a block diagram showing the structure of the computer system of the first embodiment of this invention. In the figure, reference numeral 1 denotes a diskarray system, and 30 is the (host) computer connected to the diskarray system. The diskarray system 1 contains a diskarray subset 10, a diskarray switch 20 and a diskarray system configuration manager 70 for handling the configuration of the overall disarray system. The diskarray system 1 further has a communication interface (communication I/F) 80 between the diskarray switch 20 and the diskarray system configuration manager 70, and also between the diskarray subset 10 and the diskarray system configuration manager 70. A host 30 and the diskarray system 1 are connected by a host interface (host I/F)) 31. The host I/F 31 is connected to the diskarray switches 20 of the diskarray system 1. The diskarray switch 20 and the diskarray subset 10 inside the diskarray system 1 are connected by the diskarray interface (diskarray I/F 21).

The hosts 30 and the diskarray subsets 10 are shown as four units each however this number is optional and is not limited. The hosts 30 and the diskarray subsets 10 may also be provided in different numbers of units. The diskarray switches 20 in this embodiment are duplexed as shown in the drawing. Each host 30 and each diskarray subset 10 are connected to both of the duplexed diskarray switches 20 by the respective host I/F 31 and a diskarray I/F 21. Thus even if one of the diskarray switches 20, the host I/F 31 or the diskarray I/F 21 is broken, the other diskarray switches 20, the host I/F 31 or the diskarray I/F 21 can be utilized to allow access from the host 30 to the diskarray system 1, and a high amount of usage can be achieved. However, this kind or duplication or duplexing is not always necessary and is selectable according to the level of reliability required by the system.

Figure 2:
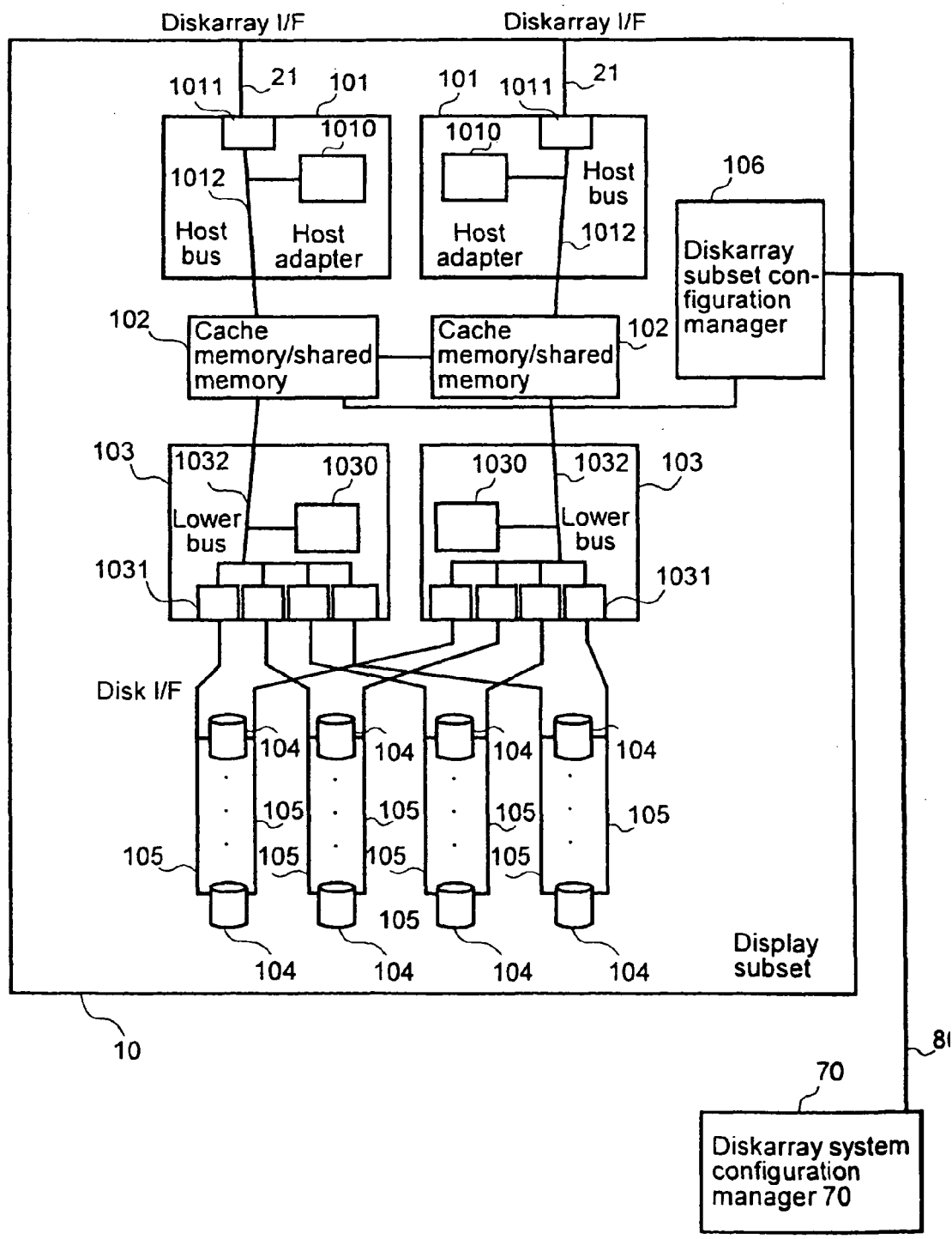
FIG. 2 is block diagram of the diskarray subset of the first embodiment.

FIG. 2 is block diagram of a diskarray subset 10 of the first embodiment. The reference numeral 101 denotes the host adapter for interpreting the commands from the host system (host 10), executing the cache hit-miss decision and controlling the data transfer between the host system and the cache. The reference numeral 102 denotes the cache memory/shared memory that comprises the cache memory for performing high speed disk data access and a shared memory for storing data shared by the host adapters 101 and the lower adapters 103. The reference numeral 104 denotes a plurality of disk units stored inside the diskarray subset 10. Reference numeral 103 is the lower adapter for controlling a disk unit 104 and controlling the transfer of data between the disk unit 104 and the caches. Reference numeral 106 is the diskarray subset configuration manner to perform communications between the diskarray system configuration manager 70 and the overall diskarray system 1, and also manage the structural parameter settings and reporting of trouble information, etc. The host adapter 101, the cache memory/shared memory 102, and the lower adapter 103 are respectively duplexed here. The reason for duplexing is to attain a high degree of utilization, just the same as with the diskarray switch 20 and is not always required. Each disk unit 104 is also controllable from any of the duplexed lower adapters 103. In this embodiment, the cache and shared memories jointly utilize the same memory means in view of the need of low costs however the caches and shared memories can of course be isolated from each other.

The host adapter 101 comprises an host MPU1010 to execute control of the adapter 101, an host system or in other words a diskarray I/F controller 1011 to control the diskarray switches 20 and the connecting I/F which is the diskarray I/F21, and an host bus 1012 to perform communications and data transfer between the cache memory/shared memory 102 and host MPU1010 and the diskarray I/F controller 1011. The figure shows one diskarray I/F controller 1011 for each host adapter 101 however a plurality of diskarray I/F controllers 1011 can also be provided for each one host adapter.

The lower adapter 103 contains a lower MPU103 to execute control of the lower adapter 103, a desk I/F controller 1031 to control the disk 104 and interface which is the disk I/F, and a lower bus 1032 to perform communications and data transfer between the cache memory/shared memory 102 and host MPU1030 and the diskarray I/P controller 1031. The figure shows four diskarray I/F controllers 1031 for each lower adapter 103 however the number of diskarray I/F controllers is optional and can be changed according to the diskarray configuration and the number of disks that are connected.

Figure 3:
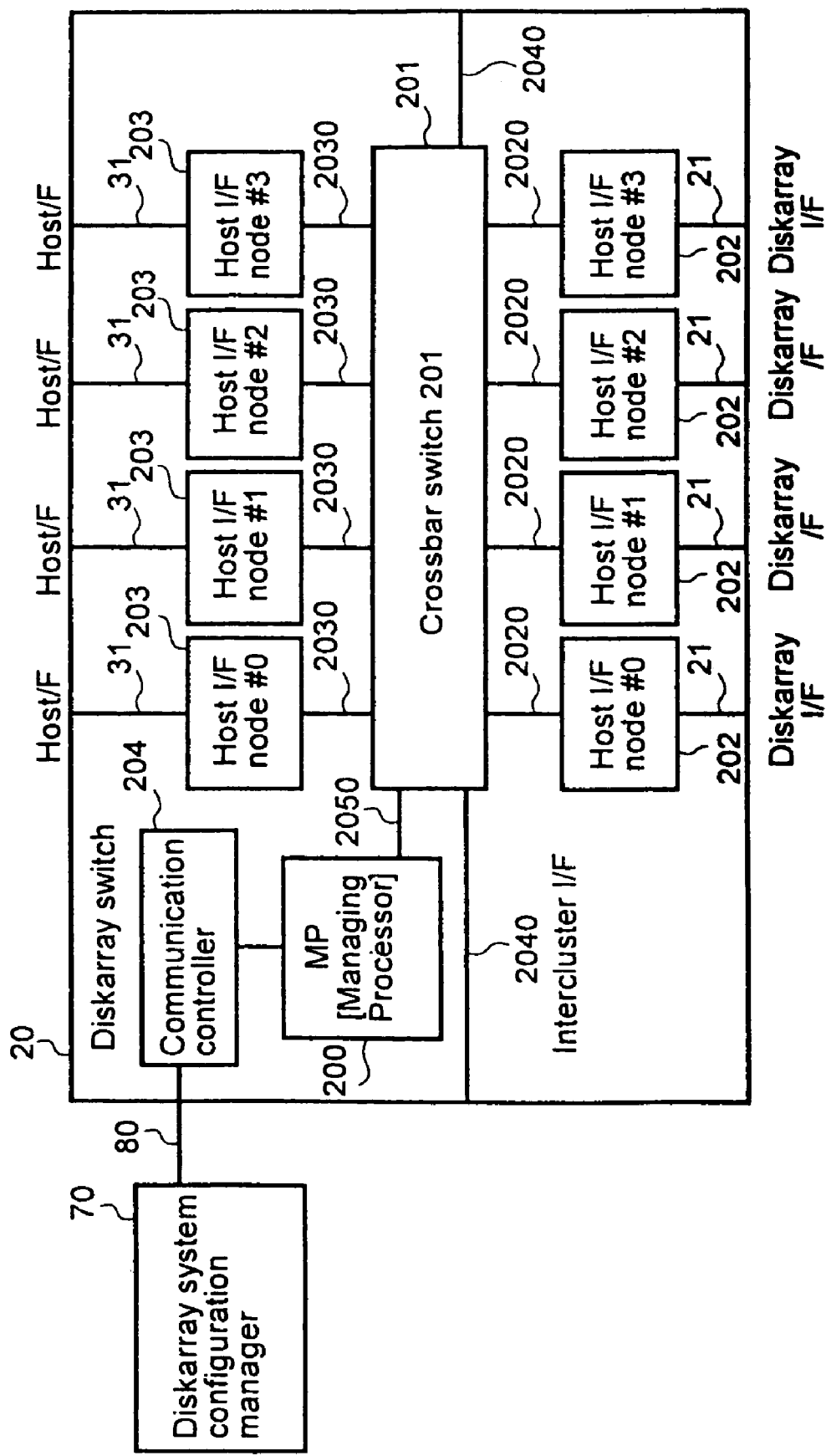
FIG. 3 is block diagram of diskarray switch of the first embodiment.

FIG. 3 is block diagram of the diskarray switch 20 of the first embodiment. The diskarray switch 20 contains a Managing Processor (MP) which is a processor for performing management and control of the entire diskarray swatch, a crossbar switch 201 for comprising n×n mutual switch paths, a diskarray I/F node 202 formed for each diskarray I/F21, a host I/F node 203 formed for each host I/F 31, and a communication controller 204 for performing communications with the diskarray system configuration manager 70. The reference numeral 2020 denotes a path for connecting the diskarray IF node 202 with the crossbar switch 201, a path 2030 connects the host I/F node 203 and the crossbar switch 201, a path 2040 connects with the other diskarray switch 20 and other IF for forming clusters, a path 2050 connects the MP200 with a crossbar switch 201.

Figure 4:
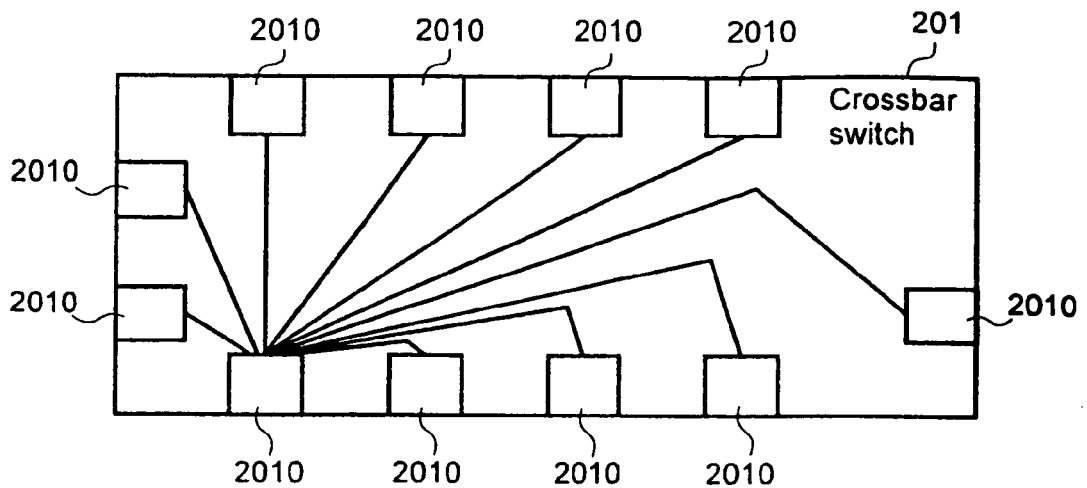
FIG. 4 is a block diagram of the crossbar switch of the diskarray switch of the first embodiment.

FIG. 4 is a block diagram showing the structure of the crossbar switch 201. A port 2010 is a switching part (SWP) for connecting the paths 2020, 2030, 2050 and cluster I/F 2040 to the crossbar switch 201. The switching ports 2010 all have the same structure and perform switching control of the transfer paths to other SWP from a particular SWP. The figure shows on SWP however identical transfer paths exist between all the SWP.

Figure 5:
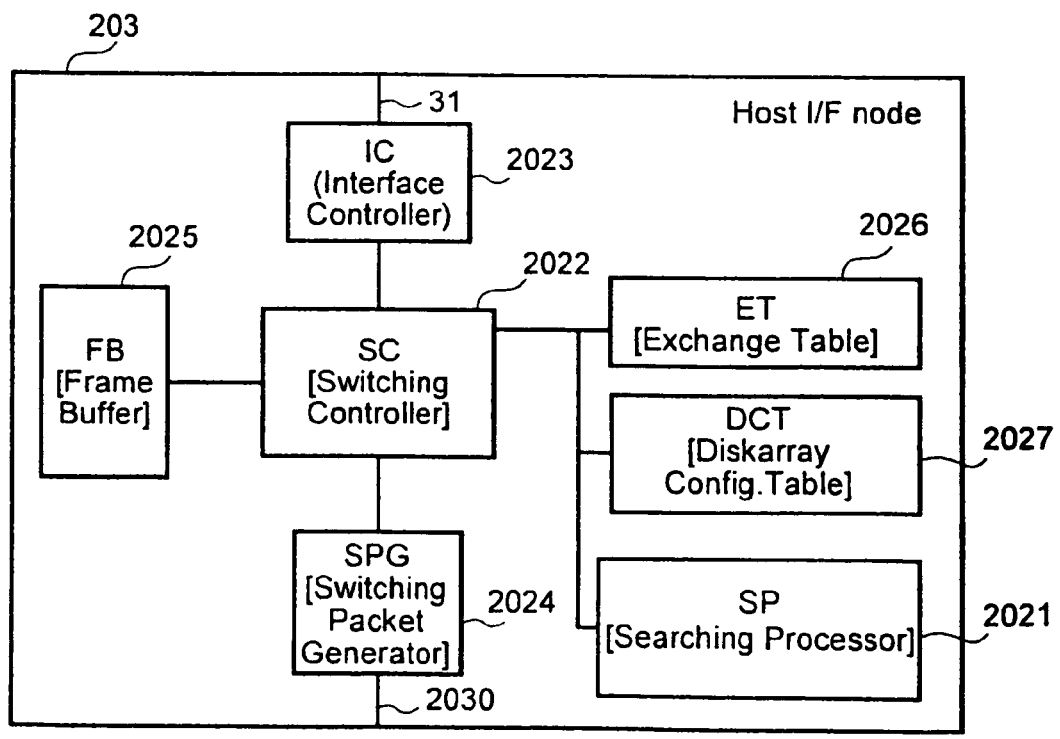
FIG. 5 is block diagram of the host I/F node for the diskarray switch of the first embodiment.

FIG. 5 is a block diagram showing the structure of the host I/F node 203. In this embodiment, use of a fiber channel is assumed for both the diskarray I/F21 and the host I/F31 in order to provide a specific description. The host I/F31 and the diskarray I/F21 can of course be implemented with interfaces other than fiber channels. By utilizing an identical interface, the host I/F node 203 and the diskarray I/F node 202 can both have the same structure. In this embodiment, the diskarray I/F node 202 has the same structure as the host I/F node 203 as shown in the figure. Hereafter, the host I/F node 203 will be described by using an example. A Searching Processor (SP) searches for what frame to connect the fiber channel frame (hereafter simply called frame) to, an Interface Controller (IC) 2023 transmits and receives the frames with the host 30 (the diskarray subset 10 when using the diskarray I/F node 202), a Switching Controller (SC) 2022 performs conversion based on results found by the SP2021 for frames received by the IC2023, a Switching Packet Generator (SPG) 2024 packetizes the frame converted by the SC2021 into a configuration that can pass the crossbar switch 201 to transfer to other nodes, a Frame Buffer (FB) 2025 temporarily stores the received frame, an Exchange Table (ET) 2026 supervises use of exchange numbers for identifying a plurality of frame strings corresponding to a disk access request command (hereafter simply called command) from one host, and a Diskarray Configuration Table (DCT) 2027 stores structural information for a plurality of diskarray subsets 10.

Each structural section of the diskarray switch 20 are preferably all comprised of hardware logic from the viewpoint of performance. However, program control utilizing general purpose processors is allowable for the SP2021 and the SC2022 functions if the specified performance can be achieved.

Each diskarray subset 10 has disk units 104 as one or a plurality of logical disk units. These logical disk units are referred to as Logical Units (LU). The LU need not correspond in a ratio of one to one, to the logical disk units 104 and one disk unit 104 can be comprised of a plurality of LU or one LU can comprise a plurality of disk units 104. One LU is recognized as one disk device as seen externally of the diskarray unit 10. In this embodiment, a logical LU is comprised further by a diskarray switch 20 and the host 30 functions to access this LU. In these specifications, when one LU is recognized as one LU by the host 30, then the LU is called independent LU (ILU) and when a plurality of LUs are recognized as one LU by the host 30, then the one LU recognized by the host 30 is called combined LU (CLU).

Figure 11:
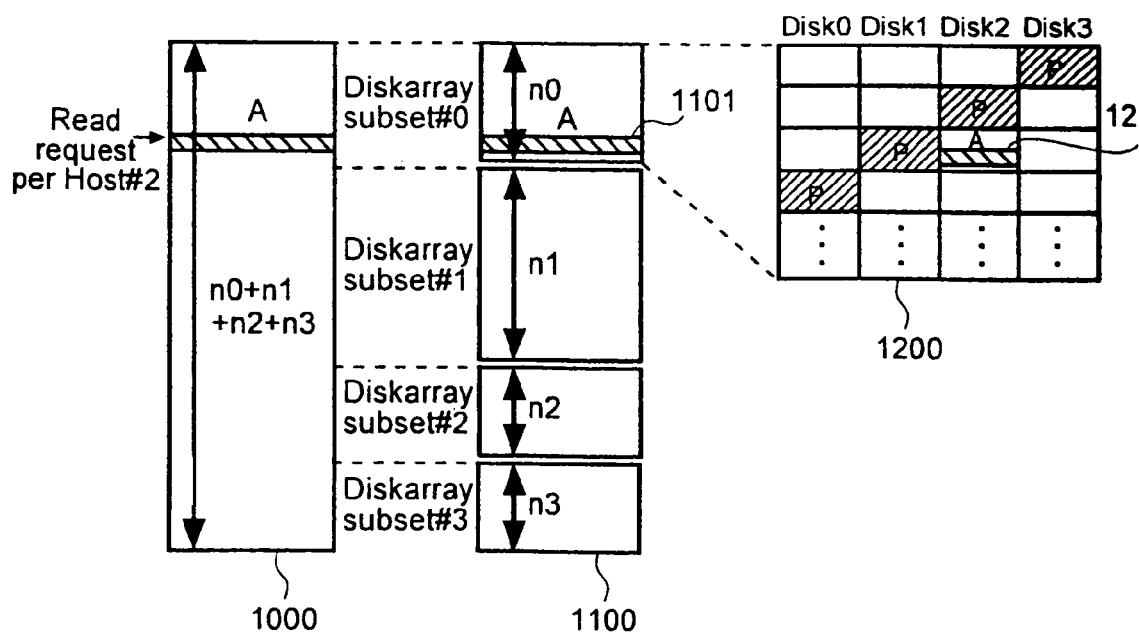
FIG. 11 is a model view showing the interactive relationship of the host-LU, the LU for each diskarray subset, as well as each diskarray unit.

FIG. 11 shows the address spatial relation for each level when one combined LU (CLU) is comprised of four LUs ox four diskarray subsets. In the figure, the numeral 1000 indicates an LU address space for one combined LU (CLU) of the diskarray system 1 as seen from the host "#2", the numeral 1100 is an LU address space for the diskarray subset 10, the numeral 1200 indicates an address space for the disk unit 104 (Here, shown only for the diskarray subset #0.) The LU for each diskarray subset 10 is comprised as a RAID 5 (Redundant Arrays of Inexpensive Disks Level 5) type diskarray, by four disk units 104. Each diskarray subset 10 has an LU with respective capacities of n0, n1, n2, n3. Each diskarray switch 20 combines the address spaces held by these four LU to obtain a combined capacity (n0+n1+n2+n3) and achieve a combined LU (or CLU) recognized from the host 30.

In this embodiment, when for instance the host #2 is accessing the region A1001, an access request is made specifying the region A1001, and this access request is converted by the diskarray switch 20 into a request for accessing the region A' 1101 of the LU of the diskarray subset #0 and this request then sent to the diskarray subset #0. This diskarray subset #0 then performs access and mapping of the region A' 1101 onto of the region A" 1202 on the disk unit 104. The mapping between the address space 1000 and the address space 1100 is based on structural information held in the DCT207 in the diskarray switch 20. The details of this processing are related later on. The mapping performed in the diskarray subset is a technical method already well known in the prior art so a detailed explanation is omitted here.

Figure 6B:
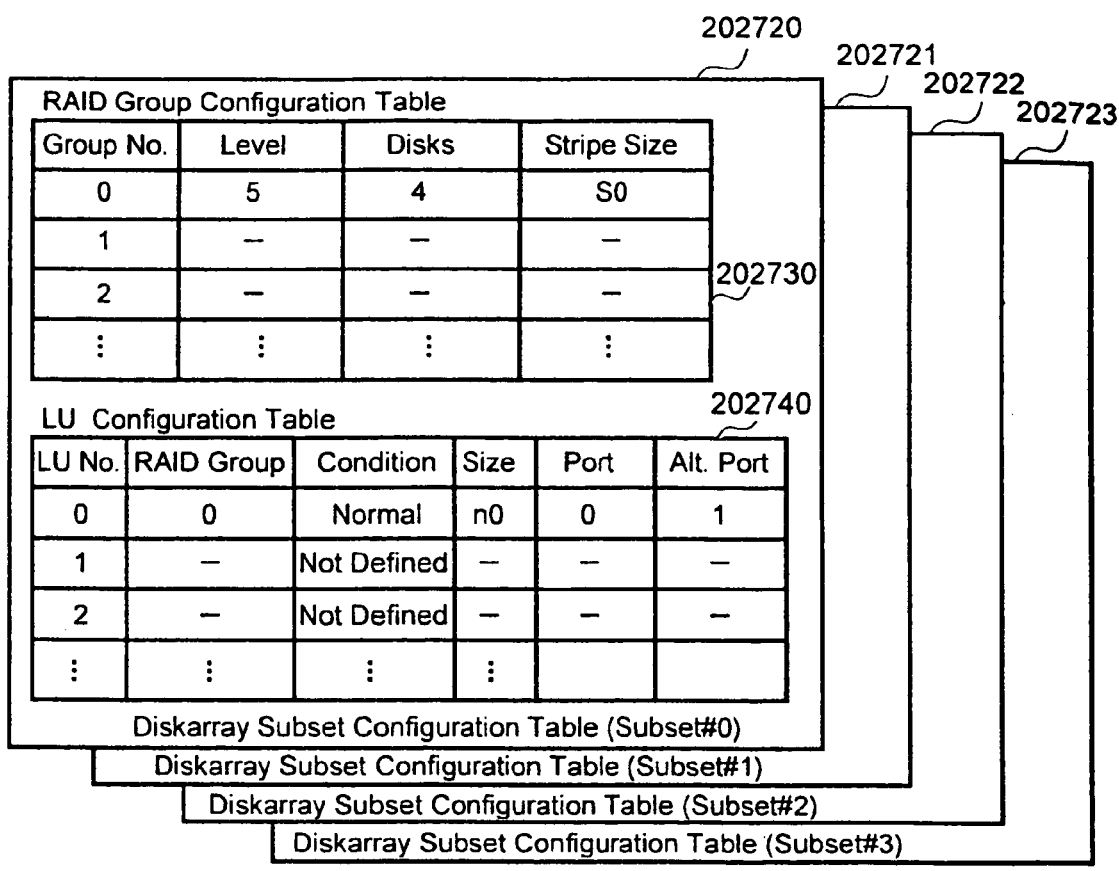
FIG. 6B is sample diskarray system configuration table.

In this embodiment, the DCT207 contains a Diskarray System Configuration Table and Diskarray Subset Configuration Tables. The structure of the Diskarray System Configuration Table is shown in FIG. 6A and the structure of the Diskarray Subset Configuration Tables are shown in FIG. 6B.

As shown in FIG. 6A, the Diskarray System Configuration Table 20270 has a Host-LU Configuration Table 20271 holding information showing the structure of the host-LU, and a Diskarray I/F Node Configuration Table 2072 showing the related connections of the diskarray subset 10 and the diskarray I/F node 202 of the diskarray switch 20.

The Host-LU Configuration Table 20271 has LU information (LU Info.) relating to the condition and Host LU of the diskarray subset 10 LU, which is information showing the LU type, CLU class, CLU stripe size and Host-LU indicating the affiliation of the LU and the Host-LU No. which is a number for identifying that LU. The LU Type in the table is information on the LU type showing that the Host-LU is a CLU or one LU. The CLU class is information showing the class is any one of "Joined", "Mirrored" or "Striped" when the LU type of this Host-LU is shown to be a CLU. Here, "Joined" indicates as shown in FIG. 11 the CLU is one large memory space consisting of a group of LU connected together. As related later in the sixth embodiment, "Mirrored" indicated two LU achieved by a duplexed LU. As related later on in the seventh embodiment, "Striped" indicates an LU stored with data distributed into a plurality of these LU. When the CLU Stripe Size is shown by 'Striped' for the CLU class, then the striping size (A block size showing the units the data is distributed in.) is indicated. The status shown in the Condition box is one of four types consisting of "Normal", "Warning", "Fault" and "Not Defined". Of these types, "Normal" indicates the Host-LU status is correct. "Warning" indicates contraction is being performed for reasons such as problems occurring in a disk unit corresponding to an LU comprising this Host-LU. "Fault" indicates that this Host-LU cannot be operated due to a problem in the diskarray subset 10. The "Not Defined" type indicates the Host-LU is not defined for the corresponding Host-LU No. The LU Info contains information specifying the diskarray subset 10 affiliated with that LU, the LUN inside the diskarray subset, as well as information showing the size for LU that comprise this Host-LU. When the Host-LU is an ILU, then information for the sole LU is registered. When the Host-LU is a CLU, then information relating to all the respective LU comprising that CLU are registered. In the Figure for instance, a Host-LU with a Host-LU No. of "0" is a CLU comprised from four LU that are LUN "0" of the diskarray subset "#0", LUN "0" of the diskarray subset "#1", LUN "0" of the diskarray subset "#2", and LUN "0" of the diskarray subset "#3". As can be seen in the table, this CLU is in the "Joined" CLU class.

The diskarray I/F node configuration table 20272 contains information on what diskarray I/F node 202 of diskarray switch 20 is connected to each port of the diskarray subset 10 connected to the diskarray I/F 21. More specifically, this table holds the Subset NO. specifying the diskarray subset 10, the Subset Port No. specifying the port, the Switch No. specifying the diskarray switch 40 connected to that port, and an I/F Node No., specifying the diskarray I/F node 202 of the diskarray switch 20. When the diskarray subset 10 has a plurality of ports, information is set for each of those ports.

As shown in FIG. 6B the diskarray subset configuration table has a plurality of tables 202720 through 202723 corresponding to each of the diskarray subsets 10. These tables include the RAID Group Configuration Table 202730 holding information showing the structure of the RAID Group inside the diskarray subset 10, and the LU Configuration Table 202740 holding information showing the structure of the LU inside the diskarray subset 10.

The RAID Group Configuration Table 202730 has a Group No. showing the number added to the RAID Group, a level showing the RAID Level of that RAID Group, and Disks with information showing the number of disk comprising that RAID Group. When that RAID Group is comprised of striping such as for RAID Level 0, 5, then information showing that Stripe Size is included. As shown for instance, in the figure in the table, a RAID Group "0" is a RAID Group comprised of four disk units. The RAID Level is 5 and the Stripe Size is 0.

The LU Configuration Table 202740 has an LU No. showing the number (LUN) added to the LU, a RAID Group showing now that LU is configured in the RAID Group, a Condition showing the status of the LU, a Size showing the size (Capacity) of that LU, a Port showing what ports of the diskarray subset 10 are capable of providing access, and also an Alt. Port showing port that can be used as alternates for that Port No. The status showing the condition are of four types just as with the Host-LU and comprise "Normal", "Warning" "Fault" and "Not Defined". The port specified by information set in the Alt. Port is utilized when a problem occurs in the port specified with information set in the Port (item) however can also be used just for accessing the same LU from a plurality of ports.

Figures 7, 8, 9:
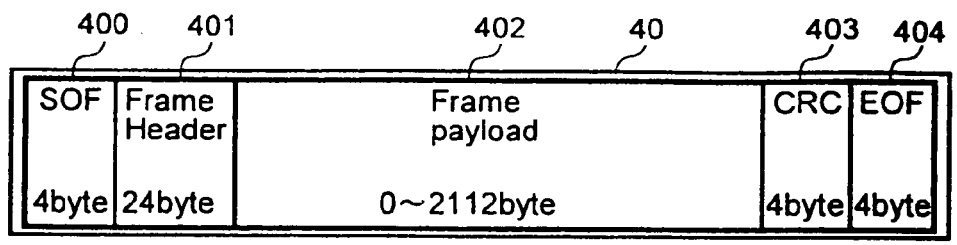
FIG. 7 is a block diagram of the frame of the fiber channel.
FIG. 8 is a block diagram of the frame header of the fiber channel.
FIG. 9 is a block diagram of the frame payload of the fiber channel.

FIG. 7 is a diagram of the frame for the fiber channel. A frame 40 of the fiber channel has an SOF (Start Of Frame) showing the beginning portion of the frame, a frame header 401, a frame payload 402 which is a segment storing data for transfer, a CRC (Cyclic Redundancy Check) 403 which is a bit error detection code, and a EOF (End Of Frame) showing the end of the frame. The frame header 401 has the structure shown in FIG. 8. The ID of the frame transfer originator (S_ID), the ID for the frame transfer destination (D_ID), Exchange IDs respectively specified by the Exchange Originator and the Exchange Responder (OX_ID, RX_ID), and the Sequence ID for specifying the frame group within the exchange (SEQ_ID) are all stored in the frame header 401. In this embodiment, the ID assigned as S_ID to the host 30 in the frame issued from the host 30 are also used as the ID assigned to the port of the diskarray switch 20 as the D_ID. One pair of Exchange ID (OX_ID, RX_ID) are assigned for one host command. When a plurality of data frames must be issued for the same Exchange, then an identical SEQ_ID is assigned to all of these data frames, and each one is identified as Sequence Count (SEQ_CNT). The Frame Payload 402 has a maximum length of 2112 byte and the contents stored in each type frame are different. In the case for instance of FCP_CMD frame related later on, the Logical Unit Number (LUN) of the SCSI and the Command Description Block (CDB) are stored as shown in FIG. 9. The CDB contains the command bytes required to access the disk (diskarray), the transfer start logic address (LBA) and the transfer length (LEN).

The operation of the disk address system of this embodiment is described next.

In order to use the diskarray system, the setting of structural information of the diskarray subset 10 must be made for the diskarray switch 20. The system administrator can acquired structural setup information for the diskarray switch 20 and the diskarray subset 10 from a management console 5 by way of the diskarray configuration manager 70. The administrator can make different kinds of required entries of setup information such as logic unit structural setup for the desired system structure, RAID level settings, alternative path settings for use when trouble occurs. The diskarray configuration manager (means) 70 can receive that setting information, and transfer that setting information to the each diskarray subset 10 and diskarray switch 20. The entry of setup information on the management console 5 is described separately in the fifth embodiment.

In the diskarray switch 20, the communications controller 204 acquires the setup information and sets the structural information such as the address space information or each of the diskarray subsets 10 by means of the MP200. The MP200 distributes the structural information of the diskarray subset 10 to the each of the host I/F nodes 203 and the diskarray I/F nodes 202 by way of the crossbar switch 201. When the nodes 202 and 203 receive this information, the SP2021 stored this structural information in the DCT2027. In the diskarray subset 10, the diskarray subset configuration manager (means) 106 acquires the setup information and stores it in the shared memory 102. The host MPU1010 and the lower MPU 1030 refer to this setup information in the shared memory 102 and perform configuration management.

Figure 10:
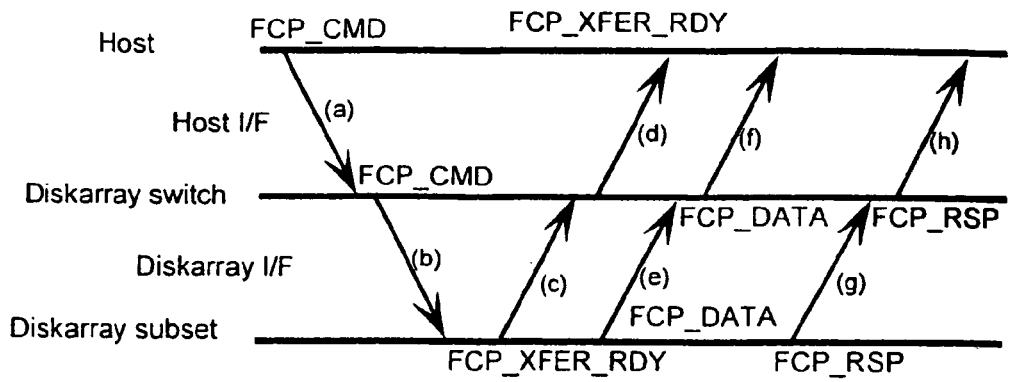
FIG. 10 is a model view showing the sequence of frames sent by way of the fiber channel during read operation from the host.
Figure 13A:
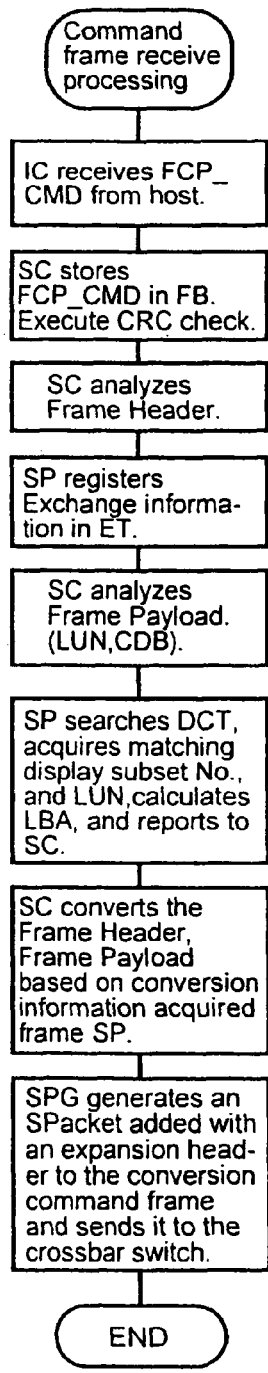
FIG. 13A through 13C are flowcharts of the processing in the host I/F node during write processing.
Figure 13B:
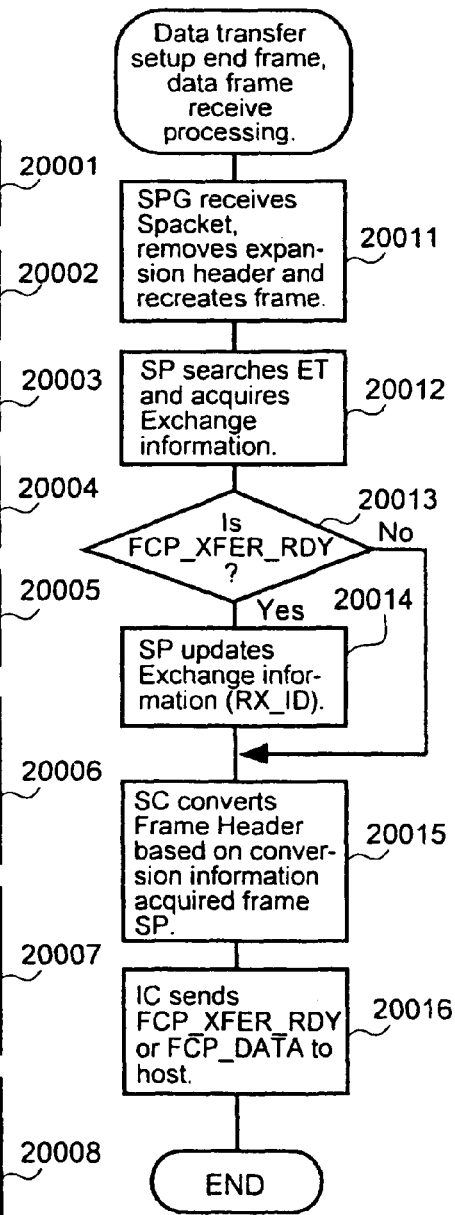
Figure 13C:
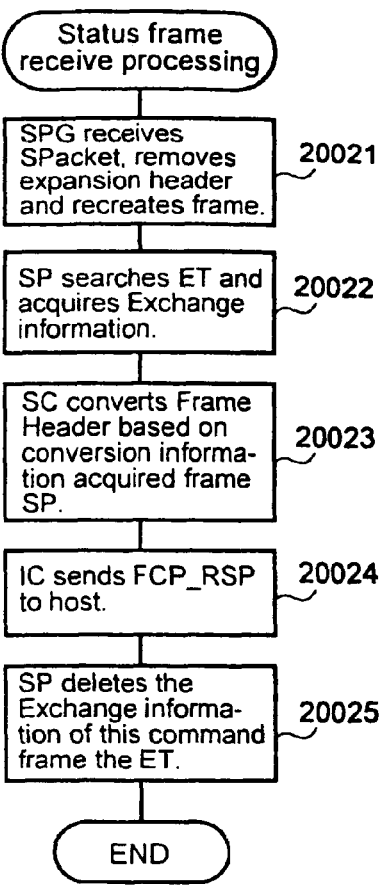

The operation when the read command is issued in described next for the diskarray system 1 with a host "#2". FIG. 10 is a model view showing the sequence of frames sent by way of the fiber channel during read operation from the host FIG. 13A through 13C are flowcharts of the processing in the host I/F node 203 during write processing In the following description, it is assumed the host "#2" is accessing the storage area A1001 in FIG. 11. The actual storage area A" corresponding to the storage area A1101 is present in the address space of the disk unit #2 comprising the LU for LUN=0 of the diskarray subset "0". In the definition of the LU comprising the address space 1000, in the Configuration Table 20271, the LU Type is defined as "CLU" and the CLU Class is defined as "Joined".

During reading of data, the host 30 issues a command frame "FCP_CMD" stored with the read command, to the diskarray switch 20 (arrow (a) in FIG. 10). The host I/F node "#2" of the diskarray switch 20 receives the command frame "FCP_CMD" (step 20001) by way of the host I/F 31 from the IC2023. The IC2023 transfers the command frame to the SC2022. The SC2022 temporarily stores the received command frame in the Frame Buffer (FB) 2025. At that time, the SC2022 calculates the CRC of the command frame and inspect the received information to determine if it is correct. If an error is found in the CRC inspection, the SC2022 reports the error to the IC2023. When the IC2023 the error report from the SC2022, a report of the CRC error is made to the host 30 by way of the host I/F31 (step 20002).

Figure 12:
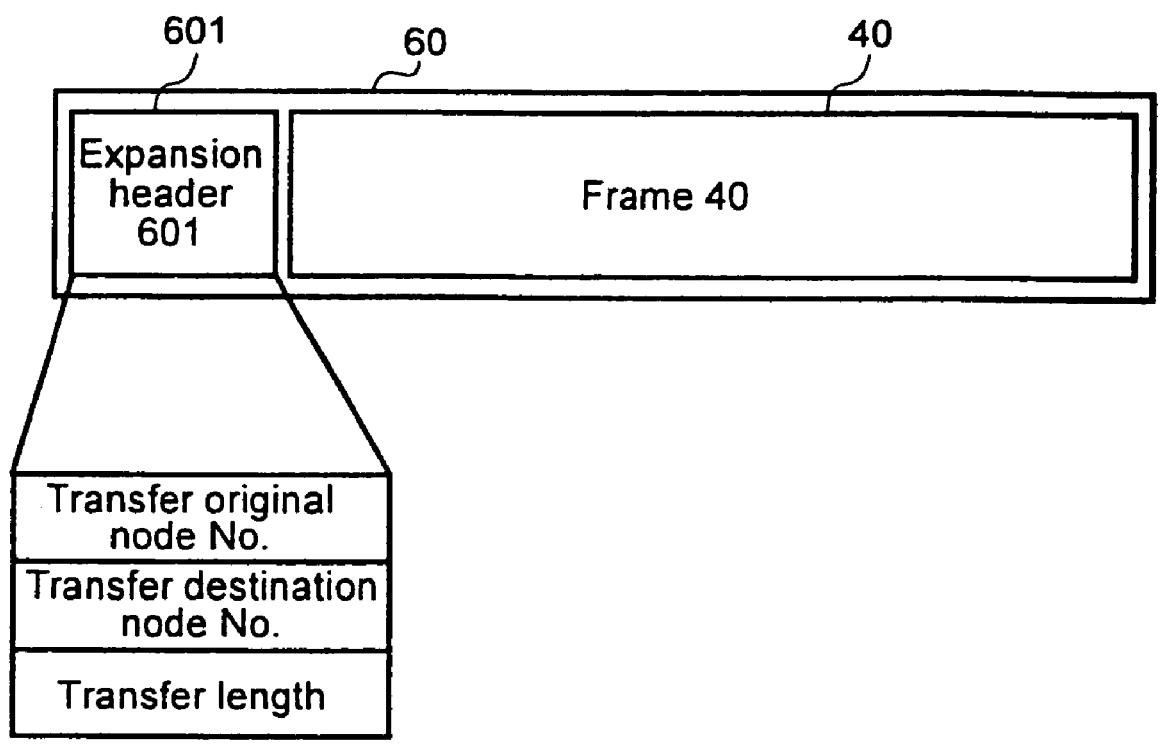
FIG. 12 is a block diagram of the S packet.

When the CRC inspection shows that the information is correct, the SC2022 reads the frame held in the FB2021, recognizes this frame as the command frame, and analyzes the Frame Header 401 (step 20003). The SC2022 then instructs the SP2021 and registers the Exchange information such as S_ID, D_ID, OX_ID in the ET2026 (step 20004). Next, the SC2022 analyzes the frame payload 402 and acquires the LUN and CDB specified by the host 30 (step 20005). The SC2021 searches the DCT2020 at the instruction of the SC2022 and acquires the structural information of the diskarray subset 10. More specifically, the SC2021 searches the host-LU configuration table 20271 and finds information having a host-LU no. matching the LUN stored in the frame payload 402 that was received. The SC2021 recognizes the structure of the Host-LU from the information set in the LU Type, and CLU class, and based on the information held in the LU Info., identifies the disk subset 10 that must be accessed and its LUN in the LU as well as the LBA in the LU. Next, the SC2021 refers to the LU configuration table 202740 of the Diskarray Subset Configuration Table 202720 and confirms the connection port for the destination diskarray subset 10, and acquires from the Diskarray I/F Node Configuration Table 20272, the node No. of the diskarray I/F node 202 connected to that port. The SC2021 in this way acquires the convention information such as the No. LUN, LBA for recognizing the diskarray subset 10 and reports this information to the SC2022 (step 20006). Next, using the acquired conversion information, the SC2022 converts the LBA from the LUN and CDB of the frame payload 402. Also, the D_ID of the frame header 401 is converted to the D_ID of the host I/F controller 1011 of the diskarray subset 10. The S_ID is not rewritten at this point (step 20007). The SC2022 transfers the converted command frame and the diskarray I/F node 40, connected to the corresponding diskarray subset 10, to the SPG2024. The SPG2024 generates a packet added with a simple expansion header 601 such as shown in FIG. 12 for the converted command that was received. This packet is called the Switching Packet (S Packet) 60. The expansion header 601 of this S Packet 60 contains an added transfer originator (white node) No., a transfer responder node No. and a transfer length. The SPG2024 send the generated S Packet 60 to the crossbar switch 201 (step 20008).

The crossbar switch 201 receives the S Packet 60 from the SWP2010 connected to the host I/F node "#2". The SWP2010 refers to the expansion header 601 of the S Packet 60, establishes a path for carrying out switch control for the SWP connecting with the transfer responder node, and transfers the S Packet 60 to the transfer responder of the diskarray I/F node 202 (Here, the diskarray I/F node "#0"). The SWP2010 establishes a path whenever the S Packet 60 is received and releases that path when transfer of the S Packet 60 is finished. In the diskarray I/F node "#0", the SPG2024 receives the S Packet 60, removes the expansion header 601 and delivers the command frame portion to the SC2022. The SC2022 writes its own ID in the S_ID of the frame header of the command frame that was accepted. Next, the SC2022 instructs the SP2021 to register the Exchange information such as the S_ID, D_ID, OX_ID, of the command frame as well as the frame transfer originator host I/F node No. into the ET2026, and transfers this command frame to the IC2023. The IC2023 complies with instructions of the frame header 401 and transfers the command frame (arrow (b) of FIG. 10) to the connected diskarray subset 10 (Here, the diskarray subset "#0".).

The diskarray subset "#0" receives the command frame "FCP_CMD" after conversion, in the diskarray I/F controller 1011. The host MPU1010 acquires the LUN and CDB stored in the frame payload 402 of the command frame and recognizes that the LEN length data from the LBA of the specified logical unit is the read command. The host MPU1010 refers to the cache management information stored in the cache/shared memory 102 and performs cache miss-hit/ht identification. If a hit then the data is transferred from the cache 102. If a miss then reading of data from the disk unit is necessary so that address conversion is implemented based on the structure of RAID 5 and a cache space is secured. Processing information required for read processing from the disk unit 2 is generated, and processing information for continued processing in the lower MPU 1030 is stored in the cache/shared memory 102. The lower MPU 1030 starts processing when the processing information is stored in the cache/shared memory 102. The lower MPU 1030 specifies an appropriate disk I/F controller 1031 and generates a read command to the disk unit 2, and issued a command to the disk I/F controller 1031. The disk I/F controller 1031 stored the data read from the desk unit 2 in the address specified by the cache/shared memory 102 and issues a completion report to the lower MPU 1030. The lower MPU 1030 stores the processing completion report in the cache/shared memory 102 for reporting to the host MPU1010 that processing was completed correctly. The host MPU1010 restarts the processing when the processing completion report is stored in the cache/shared memory 102 and reports that read data setup is complete to the diskarray I/F controller 1011. The diskarray I/F controller 1011 issues a "FCP_XFER_RDY" which is a data transfer setup completion frame on the fibber channel for the applicable diskarray I/F node "#0" of the diskarray switch 20 (arrow (c) of FIG. 10). In the disk ray I/F node "#0", when the data transfer setup completion fame "FCP_XFER_RDY" is received, the SC2022 acquires the reply responder Exchange ID (RX_ID) received from the diskarray subset 10, specifies the S_ID, D_ID, OX_ID, instructs the SP2021 and registers the RX_ID in the applicable Exchange of the ET2026. The SC2022 acquires the host I/F node No. of the transfer responder (transfer originator of the command frame) for the data transfer completion frame. The SC2022 renders the S_ID of this frame invalid and transfers it to the SPG2024. The SPG2024 generates the S Packet as described previously and transfers the S Packet to the corresponding host I/F node "#2" by way of the crossbar switch 201.

When the SPG2024 in the host I/F node "#2" receives the S Packet of the data transfer completion frame, the expansion header or the S Packet is removed, and the "FCP_XFER_RDY" reproduced and delivered to the SC2022 (step 20011). The SC2022 instructs the SC2021, searches the ET2026 and specifies the applicable Exchange (step 20012). Next, the SC2022 investigates whether the frame is "FCP_XFER_RDY" (step 20013) and if "FCP_XFER_RDY", instructs the SP2021 to rewrite the originator Exchange ID (RX_ID) of ET2026. The value added to this frame is used as the originator Exchange ID (step 20014). The SC2022 then converts the S_ID, D_ID of the frame header 401 to an appropriate value used by the ID of the host 30 and the ID of the host I/F node 203 (step 20015) The frame header 401 is thus converted to a frame corresponding to the host "#2" by means of this processing. The IC2023 issues a "FCP_XFER_RDY" data transfer completion frame for this host "#2" (arrow (d) of FIG. 10) (step 20016).

The diskarray I/F controller 1011 for the diskarray subset "#0" On generates a data frame "FCP_DATA" for performing data transfer, and transfers it to the diskarray switch 20 (arrow (e) of FIG. 10). A limit of a maximum data length of 2 kilobytes for one frame is set to limit the data transfer length of the frame payload. When this data length is exceeded, data frames just equal to the required number are generated and issued. An identical SEQ_ID is assigned to all the data frames. Except for the case where a plurality of frames are generated for the same SEQ_ID (in other words SEQ_CNT changes), data frame issue is the same as for the data transfer setup completion frame. The diskarray switch 20 implements conversion of the frame header 401 for the data frame "FCP_DATA" just the same as for the data transfer setup completion frame. However, an RX_ID has previously been established when transferring the data frame so that the processing of step 20014 for the data transfer setup completion frame is skipped. After conversion of the frame header 401, the diskarray switch 20 transfer the data fame to the host "#2" (arrow (f) of FIG. 10).

Next, the diskarray subset "#0" of the diskarray I/F controller 1011 generates a status frame "FCP_RSP" to perform the end status transfer and issued this frame to the diskarray switch 20 (arrow (g) of FIG. 10). In the diskarray switch 20, the expansion header is removed from the S Packet by the SPG2024. Just the same as the processing for the data transfer setup completion frame, the "FCP_RSP" frame is recreated (step 20021) and the ET2026 is searched by the SP2021 and the Exchange information acquired (step 20022). The SC2022 converts the frame based on this information (step 20023). The converted frame is transferred to the port "#2" by the IC2023 (arrow (h) of FIG. 10) (step 20024). Finally, the SP2021 deletes the exchange information from the ET2026 (step 20025).

The read processing is thus performed from the diskarray. In the write processing for the diskarray system 1, only the transfer direction of the data frame is reverse and the processing is otherwise the same as the read processing.

Figure 14:
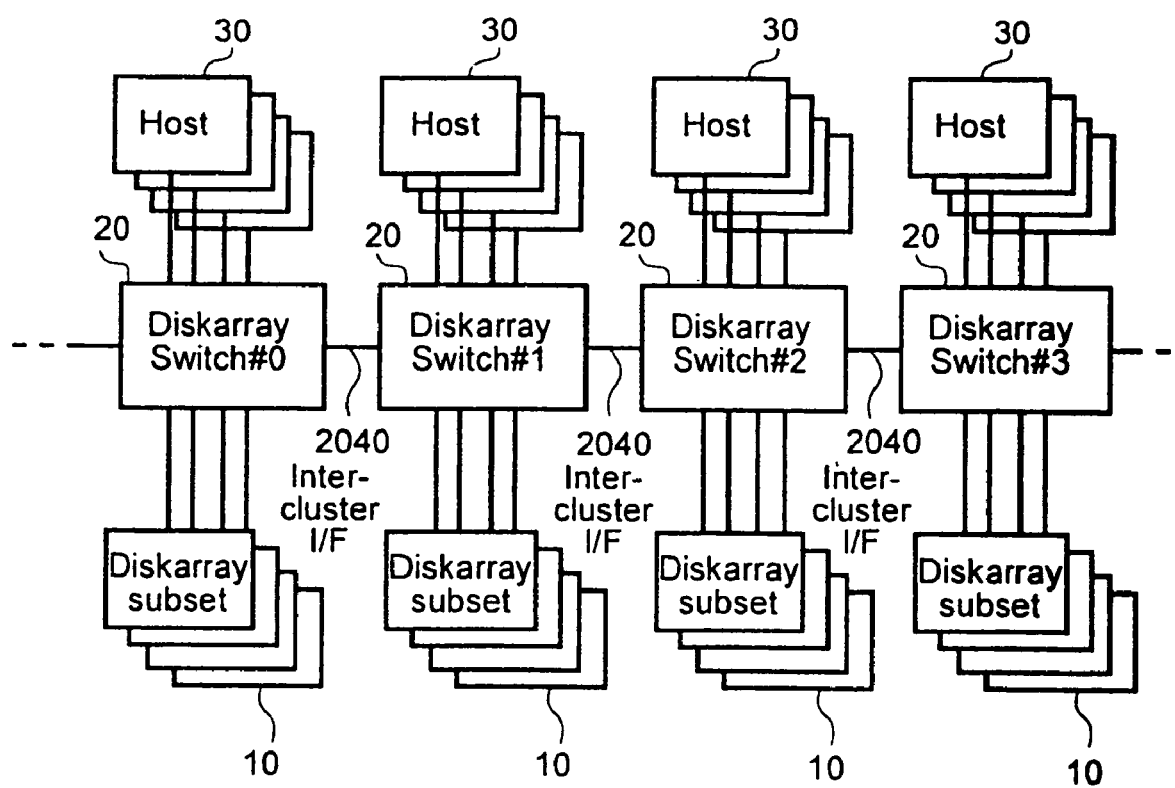
FIG. 14 is a block diagram showing a plurality of diskarray switches in a cluster-connected diskarray system.

The diskarray switch 20 as shown in FIG. 3 is provided with an intercluster I/F 2040 in the crossbar switch 201. In the system structure shown in FIG. 1, an intercluster I/F 2040 is not used. In the diskarray switch of this embodiment, other diskarray switches can be mutually connected as shown in FIG. 14, utilizing the intercluster I/F 2040. In this embodiment, only a total of eight diskarray subsets 10 and host 30 can be connected in a single diskarray switch 20 however a plurality of diskarray switches 20 can be mutually connected by utilizing the intercluster I/F 2040 and an increased number of diskarrays and hosts 10 can be connected. In the system shown in FIG. 14 for example, four diskarray switches 20 are used to connect up to a total of 32 units of the diskarray subset 10 and the hosts 30, and data can be mutually transferred between these subsets and hosts. In this way, the number of diskarray subsets and the number of hosts that can be connected are increased according to the need for performance and disk capacity in this embodiment. Also, the capacity, performance and expandability of connection units can be drastically improved since connections can be made between the host—diskarray system by utilizing the necessary amount of host I/F transfer bandwidth.

In the embodiment as described above, even if the performance of one diskarray subset unit is limited by the internal bus and the internal MPU, mutual connections can be made between the host and the diskarray subset by utilizing a plurality of the diskarray subsets, by means of the diskarray switch. In this way, high performance can be achieved as a total diskarray system. Even if the performance of a diskarray subset is relatively low, high performance can be attained by utilizing a plurality of diskarray subsets. Accordingly, low cost diskarray subsets can be connected in just the required number to match the scale of the computer system, and a diskarray system can be constructed at a cost appropriate to the desired scale. Further, when improvement in performance of increasing the disk capacity is required, then the diskarray subsets can be added in just the required amount. Still further, since a plurality of diskarray switches can be utilized to connect an optional number of hosts and diskarray subsets, a drastic improvement can be made in the capacity, the performance or the number of units for connection, and a system with high expandability obtained. Even still further, reduced elements of a diskarray system itself of the conventional art can be utilized in this embodiment so that large scale software that was previously developed can be utilized without changes, thus reducing development costs and achieving a short development period.

Second Embodiment

Figure 15:
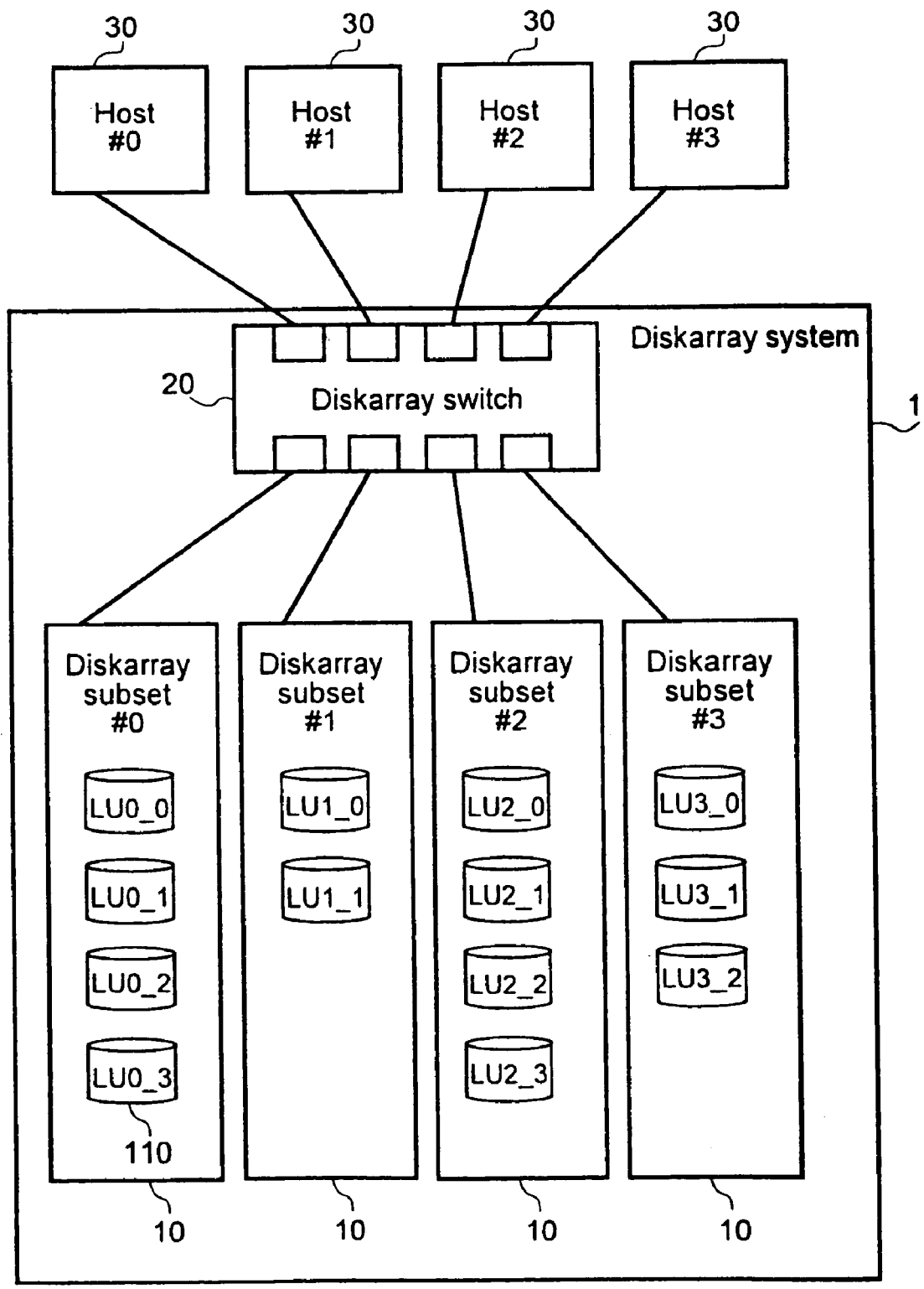
FIG. 15 is a block diagram of the computer system of the second embodiment of this invention.

FIG. 15 is a block diagram of the computer system of the second embodiment of this invention. In this embodiment, the structure differs from the first embodiment in that, in the host I/F node of the diskarray switch, only the frame header 401 is converted, the frame payload 402 is not operated and also in that the diskarray switch, the host I/F and the diskarray I/F are not duplexed (duplicated). The elements of the structure are therefore not greatly different from the first embodiment and a detailed description of those similar sections is omitted.

In FIG. 15, the diskarray subsets 10 are comprised of a plurality of logical units (LU) 110. Each LU110 is configured as an independent LU. The serial numbers assigned to the LUN in the LU110 inside the diskarray subsets 10 generally start from 0 (zero). Therefore, when showing to a host 30, consecutive LUN for all LU110 in the diskarray system 1, then converting the LUN field for the frame payload 402 is necessary, the same as in the first embodiment. In this embodiment, the LUN of the diskarray subsets 10 are shown unchanged to the host 30, so conversion of the frame payload 402 is not necessary and the control of the diskarray switches is extremely simple.

In the diskarray switches of this embodiment, it is assumed that a specified diskarray subset 10 can be accessed for each host I/F node 203. When one host I/F 31 is used in this case, only the LU110 in one diskarray subset 10 can be accessed. When accessing LU110 in a plurality of diskarray subsets 10 from one host unit is needed, then that host is connected to a plurality of host I/F nodes 203. Further, when setting access of LU110 of one diskarray subset 10 from a plurality of host 30, then loop topology or fabric topology can be utilized in the same host I/F node 203 to connect to the plurality of hosts 30. When configured in this way, during access of one LU110 from one host 10, a diskarray subset 10 can be set for each D_ID of the host I/F node 203 so that the LUN of each LU can be shown as is, to the host 30.

Since in this embodiment, the LU of each LU110 inside the diskarray subsets 10 can be shown unchanged to the host 30 for the above related reasons, then conversion of the LUN is no longer required in the diskarray switch 20. Accordingly, when the diskarray switch 20 receives a frame from the host 30, only the frame header 30 is converted the sa me as in the first embodiment, and the frame payload 402 is transferred without conversion to the diskarray subset 10. In the operation of each section of this embodiment, excluding the fact that the conversion of the frame payload 402 is not performed, the embodiment is the same as the first embodiment so that a detailed explanation of the identical sections is omitted. The diskarray switch 2 can be easily developed in this embodiment.

Third Embodiment

In the second embodiment, in the host I/F node of the diskarray switch, only the frame header 401 is converted, however in the third embodiment described hereafter, frame conversion, including the frame header is not performed. The computer system of this embodiment is configured the same as the computer system in the first embodiment as shown in FIG. 1.

In the first and second embodiments, the internal structure of the diskarray system 1 such as the number of diskarray subsets 10 and the configuration of the LU110 are concealed from the host 30. The host 30 therefore sees the entire diskarray system 1 as one storage device. In contrast, in this embodiment, the diskarray subset 10 is revealed to the host 30, and the host 30 directly uses the D_ID of the Frame header as the port ID for the diskarray subset. By this arrangement the diskarray switch can control frame transfer just by complying with the frame header information, and the fabric of the fiber channel in the conventional art can be used instead of the diskarray switch 20 to achieve an equivalent switch device.

The diskarray system configuration manager (means) 70 communicates with the communication controller 106 of the diskarray subset 10 as well as the communication means 204 of the diskarray switch 20 and acquires or sets structural information of the diskarray subsets 10 and the diskarray switches 20.

The diskarray switches 20 have a structure basically the same as the diskarray switches of the first embodiment as shown in FIG. 3. However, in this embodiment, the frame header information for frames issued from the host 30 is used unchanged to control frame transfer so that the conversion function of the first and second embodiments, in which a frame header is achieved by a DCT2027, SC2022, SPG2024 of the diskarray I/F node 202 and host Z/F node 203 of the diskarray switch, is not necessary. The crossbar switch 201 in the diskarray switch 20, performs transfer of fiber channel frames between the host I/F node 203, and the diskarray I/F node 202, according to the frame header information.

In this embodiment, to achieve total management of the diskarray system structure with the diskarray system configuration manager 70, a diskarray management table (hereafter this table is called DCT, is provided in the diskarray system configuration manager 70. The DCT comprising the diskarray system configuration manager 70 consists of a group of two tables; a Diskarray System Configuration Table 20270 and a Diskarray Subset Configuration Table 202720-202723. The host-LU in this embodiment are all comprise as one LU so that the "LU Type" in the Host-LU-Configuration table 20271 are all "ILU", and the "CLU Class" and CLU Stripe Size" are not significant.

The administrator operates the management console 5, communicates with the diskarray system configuration manager 70 and acquires information such as the number of disk units, and disk capacity of the diskarray subset 10, and performs setting of the LU110 of the diskarray subset 10 and setting of the RAID level. Next, the administrator communicates with the diskarray system configuration manager 70 from the management console 5, controls the diskarray switch 20 and sets related information among the host 30 and the diskarray subsets 10. This operation establishes the structure of the diskarray system 1 and allows LU1 to be seen as the administrator wishes, from the host 30. The diskarray system configuration manager 70 saves the above setting information, verifies the configuration according operation by the administrator and performs changes in the structure (configuration).

In this embodiment, once the diskarray system 1 is configured, a plurality of diskarray systems 1 can be handled the same as one diskarray system and without making the administrator aware of the presence of the diskarray switch 20. Further in this embodiment, the diskarray subsets 10 and the diskarray switches 20 can be operated together by means of the same operating environment and confirming their configuration (or structure) and making changes in the configuration is also simple. Still further in this embodiment, when substituting the diskarray system of this embodiment with a diskarray system used in the conventional art, no changes are made in the host 30 settings, and the structure of the diskarray system 1 wean work with the diskarray system structure used up until then, and interchangeability can be maintained.

Fourth Embodiment

A fiber channel was used in the host I/F in the first through third embodiments described above. In the embodiment hereafter described, an interface other than the fiber channel might also be used.

Figure 16:
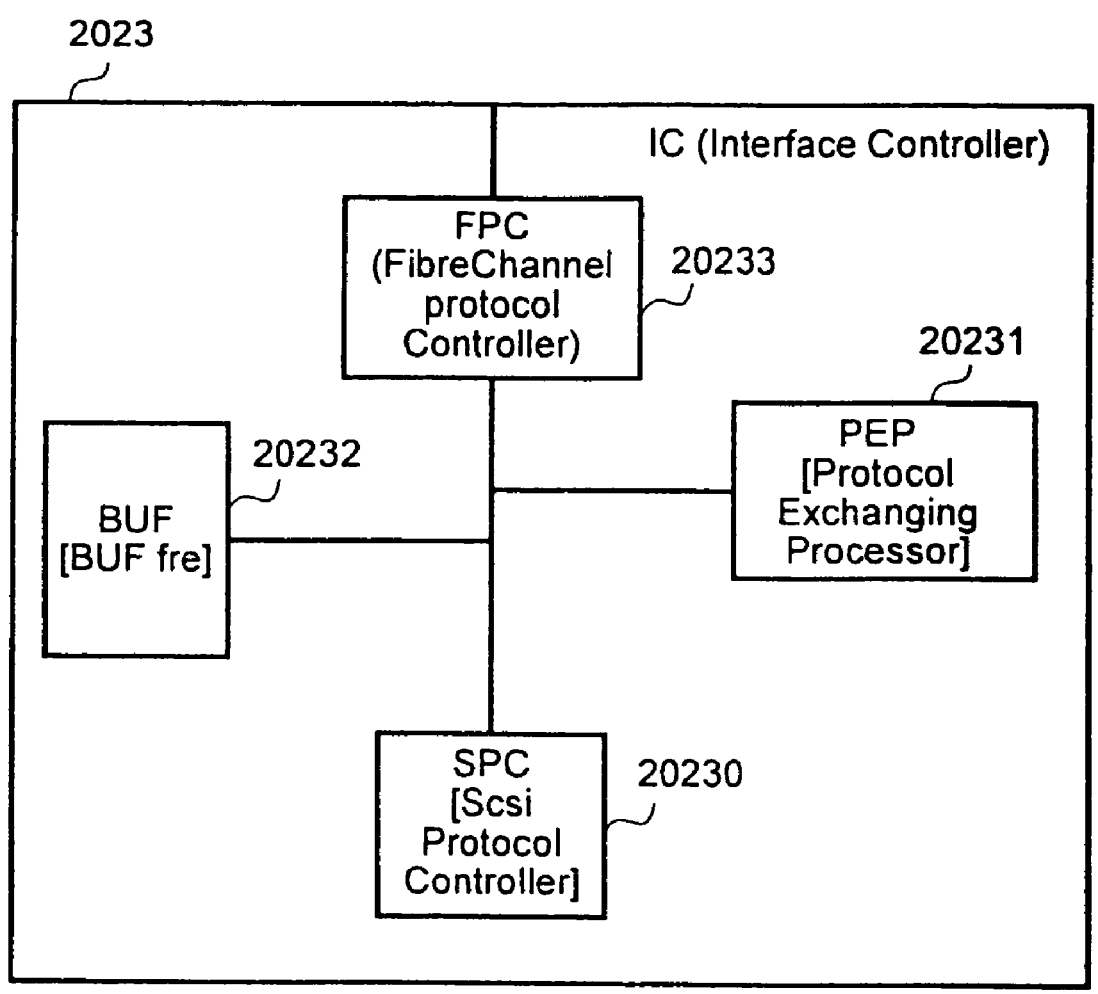
FIG. 16 is a block diagram of the diskarray switch IC of the fourth embodiment of this invention.

FIG. 16 is a block diagram of the IC (Interface Controller) 2023 inside the host I/F node 203, when the host I/F is parallel SCSI. An SCSI protocol controller (SPC) 20230 performs the protocol control of the parallel SCSI. A fiber channel protocol controller (FPC) 20233 performs control of the fiber channel. A protocol exchanging processor (PEP) 20231 converts the protocol of the serial SCSI of the fiber channel and the parallel SCSI. A buffer (BUF) 20232 temporarily stores the data of the protocol being converted.

The host 30 in this embodiment, issues a SCSI command to the diskarray I/F node 203. In the case of a read command, the SPC20230 stores this in the BUF 20232 and reports reception of the command by breaking into the PEP 20231. The PEP 20231 uses the command stored in the BUF20232, and converts the command to FPC20233 and sends it to the FPC20233. When the FPC20233 receives this command, in convert the command into a frame configuration and delivers it to the SC2022. At this time, the Exchange ID, Sequence ID, Source ID and Destination ID are added to PEP 20231 capable of the following processing. The remaining command processing is performed the same as in the first embodiment When the setup of data is complete, the data array subset 10 issues a data transfer setup completion frame, and after the data transfer ends correctly, implements issue of a status frame. In the period from the diskarray subset 10 to the IC2023, while the frame header 401 and the frame payload 402 are being converted as required, the transfer of each frame is performed. The FPC20233 of the IC2023 receives the data transfer setup completion frame, then receives the data and stores it in the BUF 20232 and if the transfer has ended correctly, receives the status report, and breaks into the PTP20231 to report that transfer of data is complete. When the PTP20231 receives the break-in (interruption), the SPC20230 starts up and instructs the start of data transfer to the host 30. The SPC20230 transmits the data to the host 30, and after confirming normal completion, interrupts the PTP20231 to report the data transfer ended correctly.

A parallel SCSI was used as an example here of a host I/F other than a fiber channel however other interfaces wan be implemented such as for ESCON in the same manner as a host I/F to the main frame. Host I/F nodes corresponding for instance, to the fiber channel, parallel SCSI and ESCON can be provided as the host I/F node 203 of the diskarray switch 20 so that all kinds of so-called open systems such a personal computers and work stations can be connected with the main frame to one diskarray system 1. In this embodiment, a fiber channel was utilized as the diskarray I/F in the first through the third embodiments however the desired optional I/F can also be used as the diskarray I/F.

Fifth Embodiment

Figure 17:
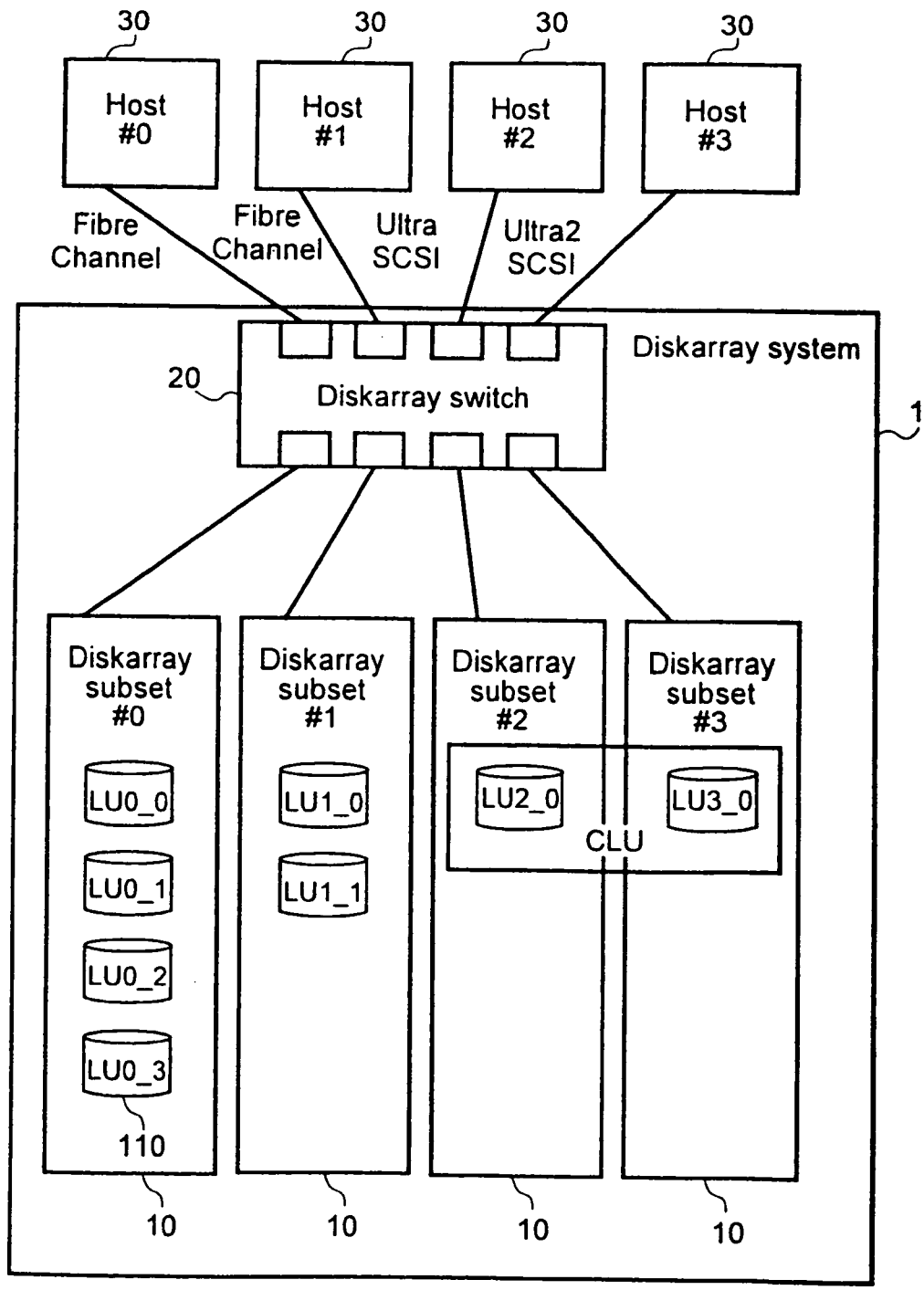
FIG. 17 is a block diagram of the computer system of the fifth embodiment of this invention.

A method for configuration management of the diskarray system 1 is described using the fifth embodiment. FIG. 17 is a system diagram of this embodiment. A total of four host 30 units are provided in this embodiment. The I/F 30 connecting between the host "#0", "#1" and the diskarray system 1 is a fiber channel, the host "#2" and the diskarray system 1 are connected by a parallel SCSI (Ultra SCSI). The host "#3" and the diskarray system 1 are connected by a parallel SCSI (Ultra2SCSI). The connection to the diskarray switch 20 of the parallel SCSI is performed in the same way as the fourth embodiment. The diskarray system 1 has four diskarray subsets 30. The diskarray subset "#0" has four independent LU. The diskarray subset "#1" has two independent LU. The diskarray subset "#2" and the diskarray subset "#3" are comprised of one combined LU (CLU). In this embodiment, just the same as the first embodiment, the diskarray subset 10 is concealed from the host 30, and the frame of the fiber channel is converted. The LUN assigned to each LU, in order from the diskarray subset "#0" are seven, LUN=0, 1, 2, . . . to 6.

Figure 18:
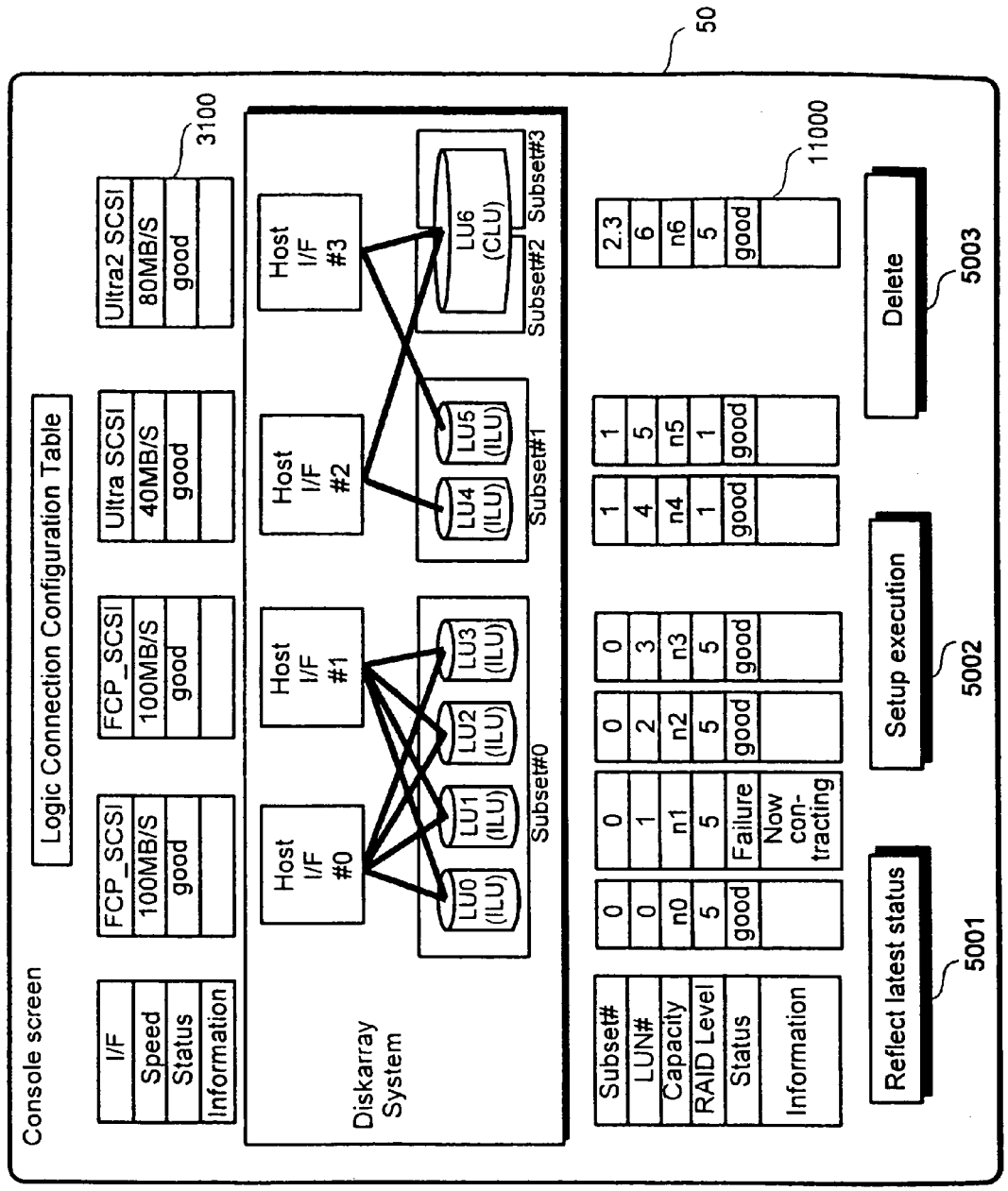
FIG. 18 is a screen configuration view showing a typical display of the logic connection structure.

FIG. 18 is a screen view showing on the management console screen 5. This figure shows the logical connection structure corresponding to the logical units (LU) and the host I/F 31. The logical connection configuration screen 50 shows the information 3100 relating to each host I/F 31, the information 11000 relating to each LU110, and the relation of the diskarray subset 10 and the Lu110. Information relating to the host I/F 31 includes the I/F type, the I/F speed and status, etc. Information relating to the Lu110 such as the storage subset No, LUN, capacity, RAID level, status, and information are displayed. The administrator refers to this information and can easily manage the configuration of the diskarray system 1. The lines drawn between the host I/F and the LU on the logical connection configuration screen 50 shows the LU110 accessible by way of each of the host I/F 31. Those LU110 to which a line is not drawn from the host I/F cannot be accessed from the host 30 connected to that host I/F. The data configuration that is handled differs according to the host 30, and also differs according to the user so that appropriate restrictions on access must be provided in order to maintain security. The administrators setting the system thereupon utilize this screen, to implement restrictions on access by granting or denying access between the host I/F and each LU110. In the figure, the LU "#0" can be accessed from the host I/F "#0" and "#1" however, the LU "#0" cannot be accessed from the host I/F "#2" and "#3". The LU "#4" can only be accessed from the host I/F "#2". In order to implement these kind of access restrictions, the access restriction information is sent from the diskarray system configuration manager 70 to the diskarray switch 20. The access restriction information sent to the diskarray switch 20 is distributed to each host I/F node 203 and registered in the DCT2027 of each host I/F node 203. When an LU search check command has been issued for an LU with access restrictions, the host I/F node 203 performs a search of the DCT2027 and if a response is not obtained to the search command or if an error is returned, than that LU is no longer recognized (authorized) from the host. The Test Unit Ready command of the Inquiry command are not typically used when in the case of SCSI protocol as search command for the presence of an LU. Since read/write cannot be implemented without this search command, restrictions on access are easy to apply. In this embodiment, access restrictions are applied to each host I/F 31 however by extending this the implementing of access restrictions on each host 30 is easily accomplished. Further, the host I/F 31, host 30, or an address space can be specified, and access restrictions can be applied according to the type of command so that read only, write only, read and write permit, and read/write prohibit are enforced. In this case, the host I/F No, the host ID, the address space or the restriction command are specified as the access restriction information and the restriction set in the disk access switch 20.

Next, the addition of another diskarray subset 10 is described. When adding a new diskarray subset 10, the administrator connects the diskarray subset 10 to be added, to an empty I/F node 202 of the diskarray switch 20. The administrator next operates the management console 5 and presses the "Show Latest Status" button 5001 displayed on the logical connection configuration screen 50. A picture showing the diskarray subsets not yet set appears on the screen (not shown in drawing) in response to pressing the button 5001. When the picture for this diskarray subset is selected, the setup screen for the diskarray subsets then appears. The on this setup screen, the administrator executes the various settings for the newly added diskarray subset items set on this screen include the RAID level and the LU configuration. Next, on switching to the logical connection configuration screen of FIG. 19, the new diskarray subset and the LU appear. From here on, the settings for restricting access for the host I/F31 are made, and the "Setup Execution" button 5002 is pressed, access restriction information, as well as diskarray subsets, and LU information for the diskarray switch 20 are transferred and the settings enabled. The procedure when adding a LU110 to the diskarray subset 10 is performed the same as in the above related procedure. The deletion of the diskarray subset, and the LU are also performed with approximately the same procedure. One point of difference is that the administrator selects the sections for deletion on the screen and presses the "Delete" button, and the deletion is implemented after making an appropriate check. Thus by utilizing the management console 5, the administrator can collectively manage the entire diskarray system.

Sixth Embodiment

Next the mirroring process by means of the diskarray switch 20 is described utilizing the sixth embodiment. The mirroring described here, is a method to support duplexed (duplicated) writing by means of two independent LU of two diskarray subsets, and duplicating including up to the controller of the diskarray subset. The reliability therefore is different from the method duplexing only the disks.

The system configuration (structure) of this embodiment is the same as shown in FIG. 1. In the configuration of FIG. 1, the diskarray subsets "#0" and "#1" are provided with completely the same LU configuration. These two diskarray subsets are seen from the host 30 as one diskarray. For reasons of convenience, the pair No. of the diskarray subset that was mirrored is called "#01". Also, a mirroring pair is formed by the LU "#1" and the LU "#0" of the diskarray subset, and this LU pair is conveniently named, LU "#01". Information for managing the LU#01 is set as "Mirrored" in the CLU class on the Host-LU Configuration Table 20271 of the DCT2027, and information relating to LU#0 and LU#1 is set as the LU Info. The configuration of the other sections is the same as in the first embodiment.

Figure 19:
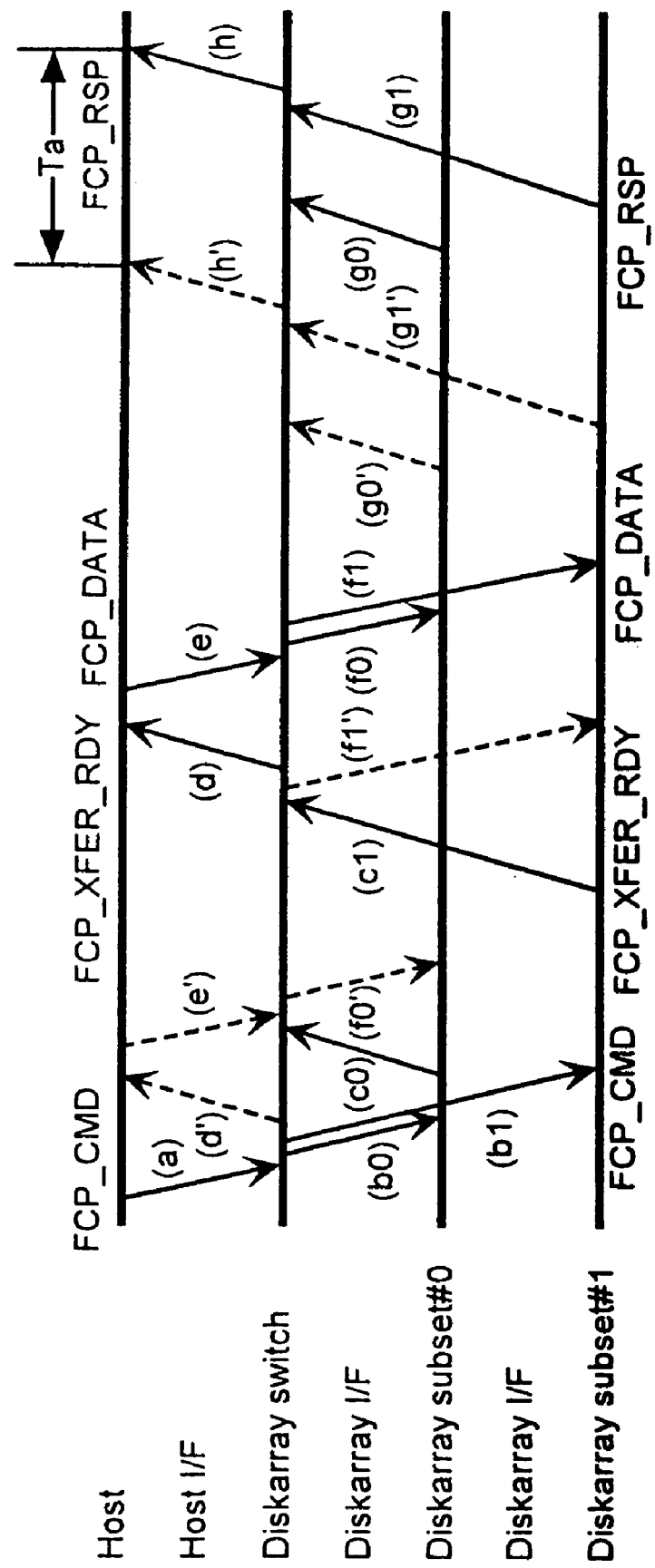
FIG. 19 is a model diagram showing the frame sequence in the sixth embodiment of this invention.
Figure 20A:
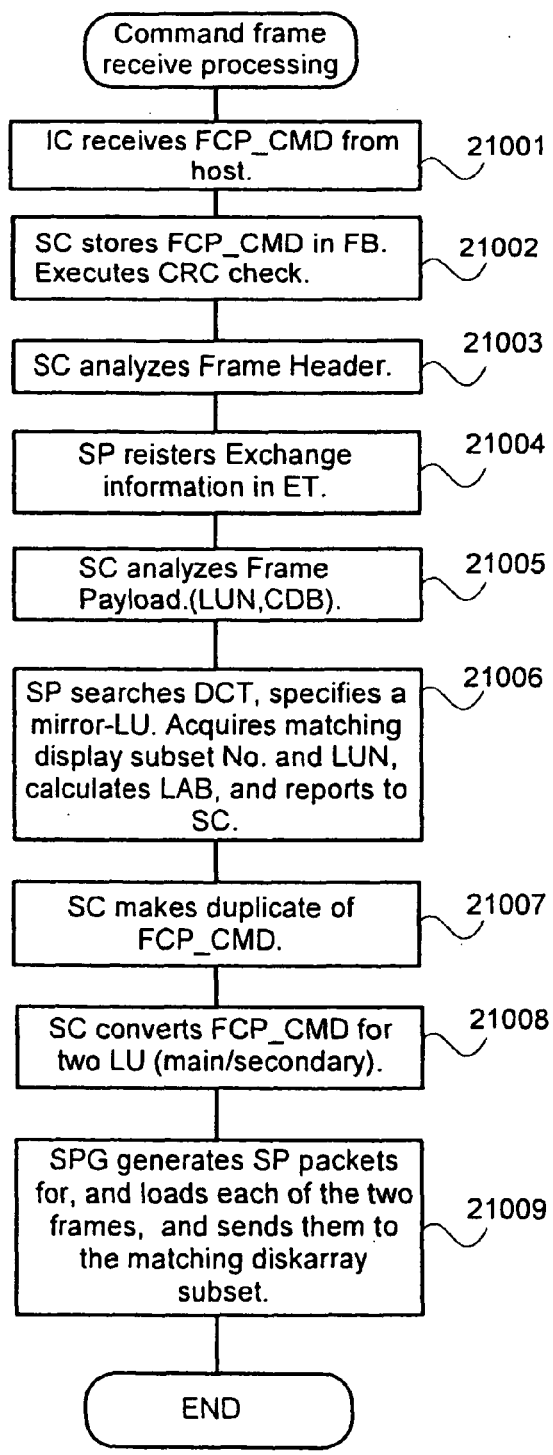
Figure 20B:
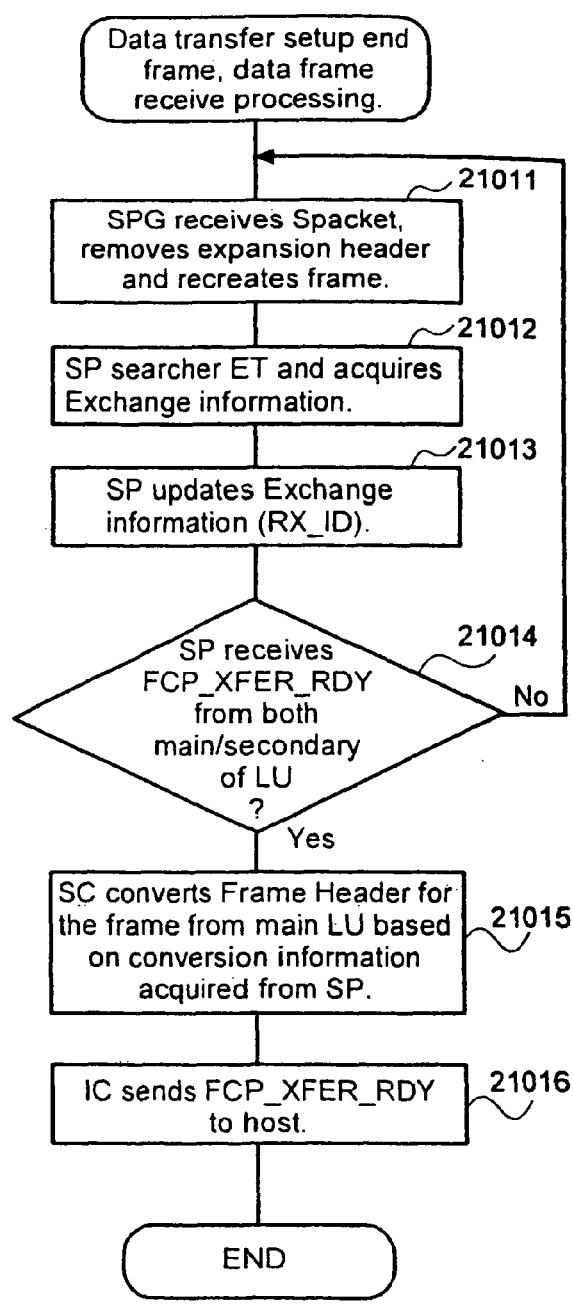

The operation of each section of this embodiment is largely the same as the first embodiment. Hereafter, the points differing from the first embodiment are explained mainly with the operation of the host I/F node of the diskarray switch 20. FIG. 19 is a model diagram showing the sequence of frames being transferred in the write operation of this embodiment. FIGS. 20A through 20D are flowcharts showing the processing in the host I/F node 203 during the write operation.

In the write operation, the write command frame (FCP_CMD) issued by the host 30 is received by the IC2023 (arrow (a) of FIG. 19) (step 21001). The write command frame received by the IC2023 is processed the same as in steps 20002-20005 in the write operation described for the first embodiment (step 21002-21005). The SC2022 searches the DCT2027 using the SP2021 and verifies that there is a write access request to the LU "#01" of the mirrored diskarray subset "#01" (step 21006). The SC2022 makes duplicates of the command frame that was received in FB2025 (step 2107). The SC2022 converts the command frame based on the structural information set in the DCT2027, and makes separate command frames for both the LU "#1" and the LU "#0" (step 21008) The LU "#0" is here called the master LU, and the LU "#1" the slave LU. The command frames are also called respectively the master command frame and the stave command frame. Both of these separate frames are stored in the exchange information in ET2026, and a command frame issued for the diskarray subset "#0" and the diskarray subset "#1" (arrows (b0)(b1) of FIG. 19) (step 21009).

The diskarray subsets "#0" and "#1" receive the command frames and the respective, independent, data transfer setup completion frames "FCP_XFER_RDY" are distributed to the diskarray switch 20" (arrows (c0) (c1) of FIG. 19). In the diskarray switch 20, the data transfer setup completion frames transferred by the same processing as in steps 20011-20013 of the read operation in the first embodiment, are processed in the host I/F node 203 (step 21011-21013). At the stage that the data transfer setup completion frames from each diskarray subsets are arranged (step 21014), the SC2022 converts the master data transfer setup completion frames (step 21015), and after frame conversion by the IC2023 sends the frame to the host 30 (arrow (d) of FIG. 19) (step 21015).

After receiving the data transfer setup completion frame, the host 30 sends the data frame (FCP_DATA) to the diskarray switch 20 (arrow (e) of FIG. 19). When the data frame from the host 30 is received by the IC2023 (step 21031), the read command frame and the write command frame are both stored in the FB2025, and a CRC check and frame header analysis are performed (steps 21032, 21033). The ET2026 is searched by the SP2021 based on the frame header analysis results, and the Exchange information is acquired (step 21034). The SP2022 makes duplicates the same as during the write command frame (step 21035). One copy is sent to the LU "#0" of the diskarray subset "#0" and the other is sent to the LU "#1" of the diskarray subset "#1" (arrow (f0)(f1) of FIG. 19) (step 21037).

The diskarray subsets "#0" and "#1" receive each of the data frames, respectively write these frames in the disk unit 104, and set the status frame (FCP_RSP) to the diskarray switch 20. When the SP2022 receives the status frames from the respective diskarray subsets "#0" and "#1", their respective expansion headers are removed from their status frames, the frame header restored and the exchange information acquired from the ET2026 (step 21041, 21042). When the status frames from both the diskarray subsets "#0" and "#1" are arranged (step 21043), conversion of the master status frame from the LU "#0" is performed (step 21044) after checking that the status has completed correctly, and the slave status frame is deleted (step 21045). Then, the IC2023 sends a command frame to the host to report correct completion (arrow (h) of FIG. 19) (step 21046). Finally, the SP2021 deletes the exchange information of ET2026 (step 21047).

The write processing in the mirrored structure is thus completed. The read processing for the mirrored LU "#01" differs only in the direction of data transfer, and is performed largely the same as the above described write processing except that the issue of a read command to two diskarray subsets is not necessary, and a command frame can be issued just to either diskarray subset. A command frame for instance can be issued mainly to the master LU however for high speed operation, methods such as alternate issue of command frames for both the master/slave LU will prove effective in distributing the load.

In the above related processing, in steps 21014 and step 21043, a reply from the two diskarray subsets LU "#0" and "#1" is awaited, both synchronized with and the process then proceeds. With this kind of control, handling of errors is simple since the process proceeds after verifying the success of the processing for both of the diskarray subsets. On the other hand this kind of control has the drawback performance declines since the overall processing speed depends on which of the replies is slower. To resolve this problem, in the diskarray switch, control such as by proceeding to the next process without waiting for a reply from the diskarray subset or a "Asynchronous type" control that proceeds to the next process at the print where a reply from either one of the diskarray subsets is received are possible. The frame sequence when this asynchronous type control is used is shown by the dashed arrow lines in FIG. 19. In the frame sequence shown by the dashed arrow lines, the sending of the data transfer setup complete frame to the host performed in step 21016, is implemented after the processing in step 21009, without waiting for the data transfer setup complete frame from the diskarray subset 10. In this case, the data transfer setup complete frame sent to the host, is generated by the SC2022 of the diskarray switch 20 (dashed arrow line (d')). The data frame from the host 30 is transferred to the diskarray switch 20 at the timing shown by the dashed arrow line (e'). In the diskarray switch 20, this data frame is temporarily stored in the FB2025. The SC2022 makes a reply after receiving the data transfer setup complete frame from the diskarray subset 10, and transfers the data frame held in the FB2025 (dashed arrow lines (f0'), (f1')) per the data transfer setup complete frame sent from the diskarray subset 10. The completion report to the host 30 from the diskarray switch 20 is performed (dashed arrow line (h')) when there is a report (dashed arrow lines (g0'), (g1')) from both of the diskarray subsets 10. This kind of processing can shorten the processing time by an amount equal to the time Ta shown in FIG. 19.

The following processing is implemented when an error occurs during frame transfer between the diskarray subset 10 and the diskarray switch 20. When the process being implemented is write processing, then a retry process is performed on the LU in which the error occurred. If the retry process is a success, then the process continues unchanged. However, when the retry process fails after a preset number of retries, then the diskarray switch 20 prohibits access to this diskarray set 10 (or LU) and information showing this prohibition is registered in the DCT2027. The diskarray switch 20 also reports this information to the diskarray system configuration manager 70 by way of the communication controller 204 and the MP200. The diskarray system configuration manager 70 then issues an alarm to the management console 5 in response to this report. The administrator can thus recognize that trouble has occurred. Afterwards, the diskarray switch 20 continues the operation by utilizing a normal diskarray subset. The host 30 also continues processing without recognizing that an error has occurred.

This embodiment utilizes a mirror configuration in a two unit diskarray subsystem to that the disk is made more resistant to problems that occur. The resistance of the diskarray controller, diskarray I/F, and the diskarray I/F node can also be improved, and the reliability of the overall diskarray system can be improved without taking measures such as duplexing (duplicating) the internal buses.

Seventh Embodiment

In the seventh embodiment, a method is described for combining three or more diskarray subsets 10 and configuring them into one logical diskarray subset group. In this embodiment, data is distributed and stored into a plurality of diskarray subsets 10. Distributing and storing the data in this way allows distributing the access to the diskarray subsets, to prevent the access being concentrated in a particular diskarray subset so that the throughput of the total group is improved. A diskarray switch is used in this embodiment to implement this kind of striping.

An address map of the disk address system 1 of this embodiment is shown in FIG. 21. The address space for the diskarray subsets 10 is striped at a stripe size S. The address spaces of the disk address system 1 as seen from the host are distributed into the diskarray subsets "#0", "#1", "#2" and "#3". The size of the stripe size S is optional however should not be reduced very much. If the stripe size S is too small, the possibility of the occurrence of the stripe crossover, which is a phenomenon that the target data attaches to a plurality of stripes across diskarray subsets, will be risen and overhead may occur in the process. When the stripe size S is set large, then the probability that stripe crossover will occurs diminishes, so a large stripe size S is preferable in terms of improved performance. The number of LU that can be set is optional.

Figure 22:
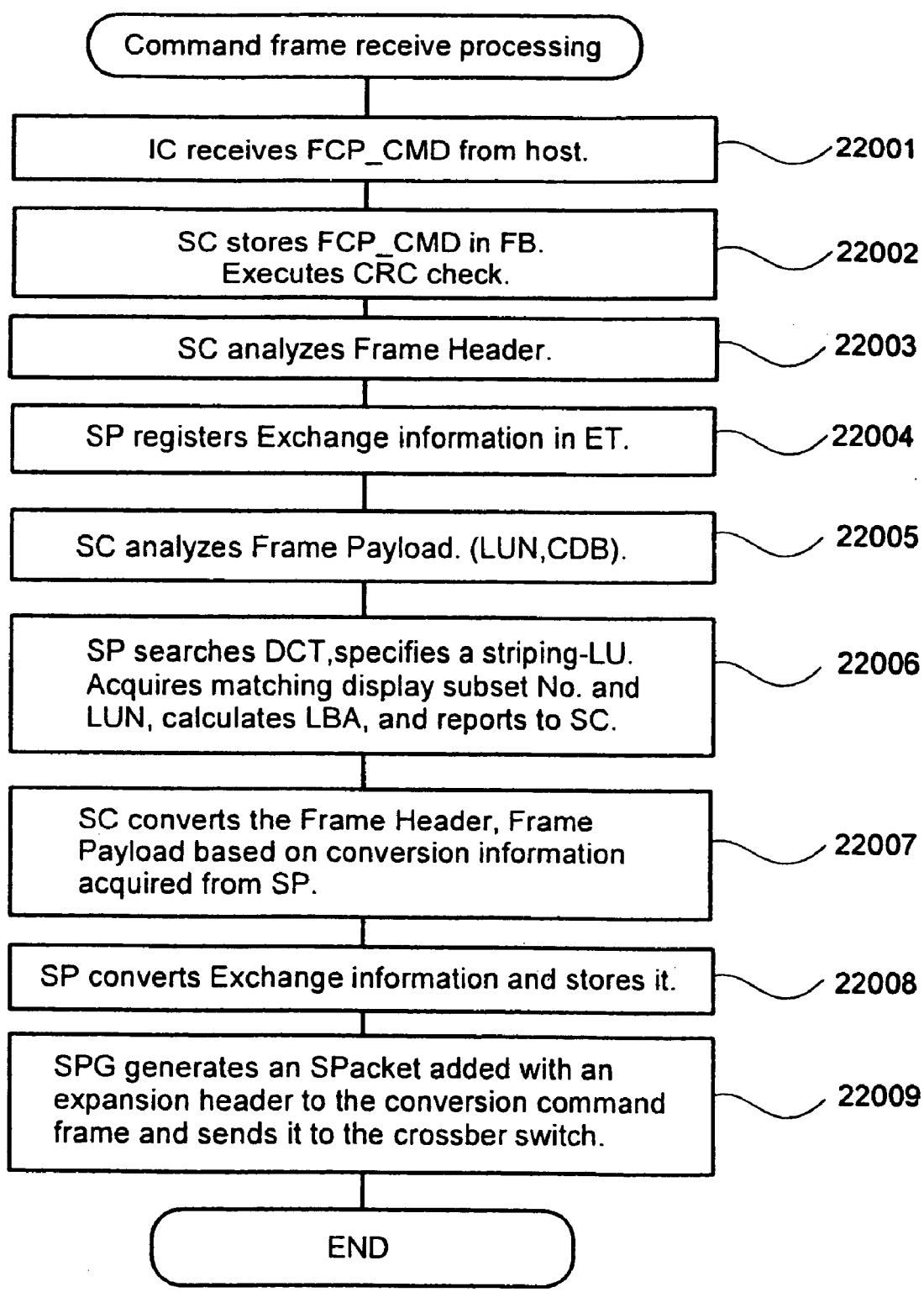
FIG. 22 is a flowchart showing the processing in the host I/F node of the seventh embodiment of this invention.

Hereafter, the operation of the host I/F node 203 in this embodiment is described while referring to the operation flowchart shown in FIG. 22 and points differing from the first embodiment are described. In this embodiment, as information relating to the striped Host-LU, "Striped" is set in the CLU Class and "S" is set in the CLU Stripe Size, in the Host-LU Configuration Table 20271 of the DCT2027.

When a command frame is issued from the host 30, the diskarray switch 20 receives this command frame with the IC2023 of the host I/F node 203 (step 22001). The SC2022 accepts this command frame from the IC2023, searches the DCT2027 using the SP2021 and verifies that striping is necessary (step 22005). Next, SC2022 searches the DCT2027 using the SP2021, finds from the structural information containing the stripe size S, the stripe No. for the stripe belonging to the data being accessed, and designates what diskarray subset 10 this stripe is stored in (step 22006). Stripe crossover may possible occur at this time however this processing in such a case is related later. When no stripe crossover occurs, the SC2022 implements conversion of the command frame (step 22007) based on SP2020 calculation results, and stores the exchange information in the ET2026 (step 22008). The subsequent processing is the same as for the first embodiment.

When stripe crossover has occurred, the SP2021 generates two command frames. These frames are generated for instance, by duplicating the command frame issued from the host 30. New settings are made such as for the frame header and frame payload of the generated command frame. After duplicating the command frame in SC2022, conversion can also be implemented the same as in the sixth embodiment however in this embodiment is newly made by SP2022. Wlen the two command frames are made, the SC2022 sends there frames to the respective diskarray subsets 10. Data transfer is then performed the same as in the first embodiment. The point in this embodiment differing from the first embodiment is that the data itself must be transferred between one host 30 and two diskarray subsets 10. In the read process for instance, the data frame transferred from the two diskarray subsets 10, must be transferred to all the hosts 30. The SC2022 at this time, complies with the information registered in the ET2026, and adds the appropriate exchange information, in the appropriate order to the data frame transferred from the diskarray subset 10 and sends this to the host 30. In the write process, two data frames are made, the same as for the command frame, and transferred to the applicable diskarray subset 10. The sequential control of the data frames at the host or the diskarray subset is called the "Out of Order" function. This "Out of Order" function is not required if the configuration is compatible with nonsequential processing. Finally, when all data transfer is complete, and the diskarray switch 20 has received the status frames respectively from the two diskarray subsets 10, the SP2021 (or the SC2022) makes a status frame for the host 30, and the IC2023 sends this status frame to the host 30.

This embodiment as described above, is capable of distributing the access (load) into a plurality of diskarray subsets, so that along with improving the total throughput, the access latency can be reduced.

Eighth Embodiment

Next, the duplicating operation between the two diskarray systems (or the diskarray subsets) is described using the eighth embodiment. In the system described here, one of two diskarray systems is installed at a remote location to provide recovery assistance in case of damage to the other diskarray system due to a natural or man-made calamity, etc. This kind of countermeasure for dealing with damage from disasters is referred to as disaster recovery and the making of copies performed with the diskarray system at the remote location is referred to as remote copy.

In the mirroring as described in the sixth embodiment, the mirror function is achieved with the diskarray subsets 10 installed at largely the same location geographically so that diskarray I/F21 can use a fiber channel. However when diskarrays (diskarray subsets) are performing remote copy at remote locations in excess of 10 kilometers, then a fiber channel cannot be used to transfer a frame unless relay equipment is added. A mutual distance of some several hundred kilometers is used during disaster recovery so that use of fiber channels for connecting between diskarrays is impractical. Therefore methods such as satellite communications or high speed public telephone lines with ATM (Asynchronous Transfer Mode) are utilized.

Figure 23:
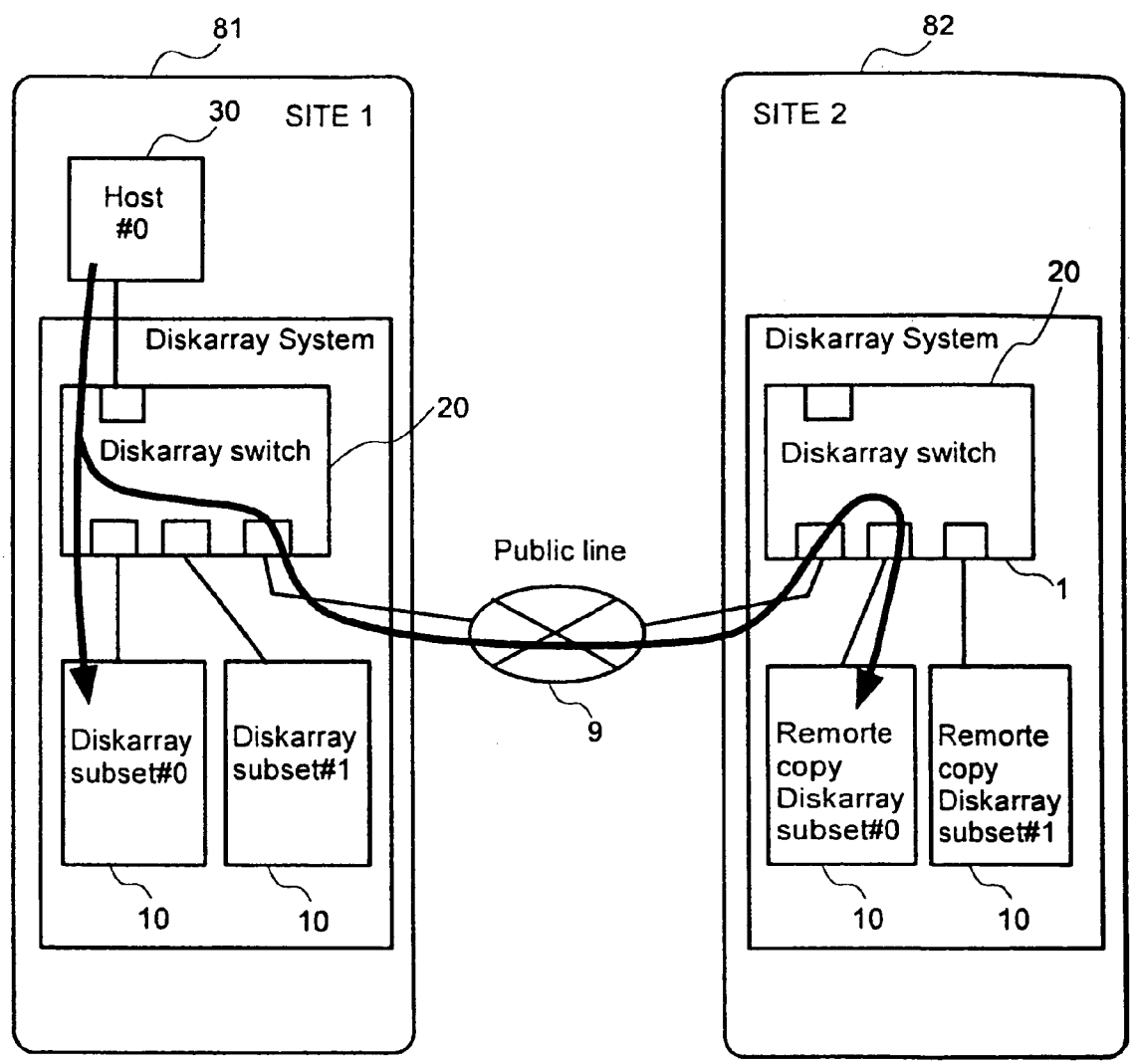
FIG. 23 is a block diagram of the disaster recovery system of the eight embodiment of this invention.

FIG. 23 is a block diagram of the disaster recovery system of the embodiment. In the figure, the reference numeral 81 denotes site A, 82 denotes site B. Both sites are installed at geographically remote locations. Reference numeral 9 denotes a public telephone line, through which the ATM packet passes. The site A81 and the site B82 each have a diskarray system 1. In this case, the site A81 is the normally used site, while site B82 is used as the remote disaster recovery site when site A81 is down due to a disaster. The contents of the diskarray subset "#0" and "#1" of the diskarray system 10 of the site A81 are copied to the remote copy diskarray subset "#0" and "#1" of the diskarray system 10 of site B82. The node for connection to the remote site from among the I/F nodes of the diskarray switch 20 is connected to the public telephone line 9 by utilizing ATM. This node is called the ATM node 205. The ATM node 205 is configured the same as the host I/F node shown in FIG. 5, and the IC2023 performs ATM—fiber channel conversion. This conversion is achieved by same method as the SCSI—fiber channel conversion in the fourth embodiment.

The remote copy process in this embodiment is similar to the mirroring process in the sixth embodiment. The points differing from the mirroring process of the sixth embodiment are explained next. When the host 30 issues a write command frame, the diskarray system 10 of site A81 performs frame duplicating the same as in the sixth embodiment, and transfers one of the copied (duplexed) frames to its own diskarray subset 10. The other frame is converted from a fiber channel frame to an ATM packet by the ATM node 205 and sent to the site B82 by way of the public telephone line 9. At the site B82, the ATM node 205 of the diskarray switch 20 receives this packet. The IC2023 of the ATM node 205, restores the fiber channel frame from the ATM packet, and transfers the fiber channel frame to the SC2022. The SC2022 implements frame conversion the same as when the write command was received from the host 30 and transfers the frame to the remote copy diskarray subset. From hereon, fiber channel—ATM conversion is performed for all the data transfer setup completion frames, data frames and status frame, and by implementing the same frame transfer process, remote copy can be achieved. When the read command frame was issued from the host 30, the diskarray switch 20 transfers the command frame only to the diskarray subset 10 only for its own site and reads this data only from the diskarray subset 10 of its own site. The operation at this time is the same as in the first embodiment.

This embodiment is capable of making backups of user data in real-time and providing recovery assistance when damage has occurred to a diskarray system site due to a disaster, etc.

Ninth Embodiment

The combining of a plurality of LU in one diskarray subset 10 is described next. The disk storage device for a main frame for instance, has a logical volume size set to a maximum value of 2 GB in order to maintain interchangeability with the previous system. When using this kind of diskarray system as an open system, the LU receive the same restrictions on the logical volume size, so that the hosts see this configuration as a large number of small size LU. This kind of method has the problem that operating the system is difficult when the system has developed to a high capacity level. To deal with this problem, a method was contrived for combining these logical volume (in other words LU) units into one large combine LU (CLU) structure by means of the diskarray switch 20. The forming of a combined LU (CLU) is achieved in this embodiment by the diskarray switch 20. The combining of LU in this embodiment is the same as the forming of combined LU by means of a plurality of diskarray subsets 10 in the first embodiment. The differing point is only that in this embodiment, a plurality of LU are combined within the same diskarray subset 10. The operation as a diskarray system is completely the same as in the first embodiment.

By combining a plurality of LU in the same diskarray subset 10 in this way, to form one large LU, a diskarray system is achieved having excellent operability, reduced management cost and in which there is no need for the host to manage a large number of LU.

Tenth Embodiment

Figure 24:
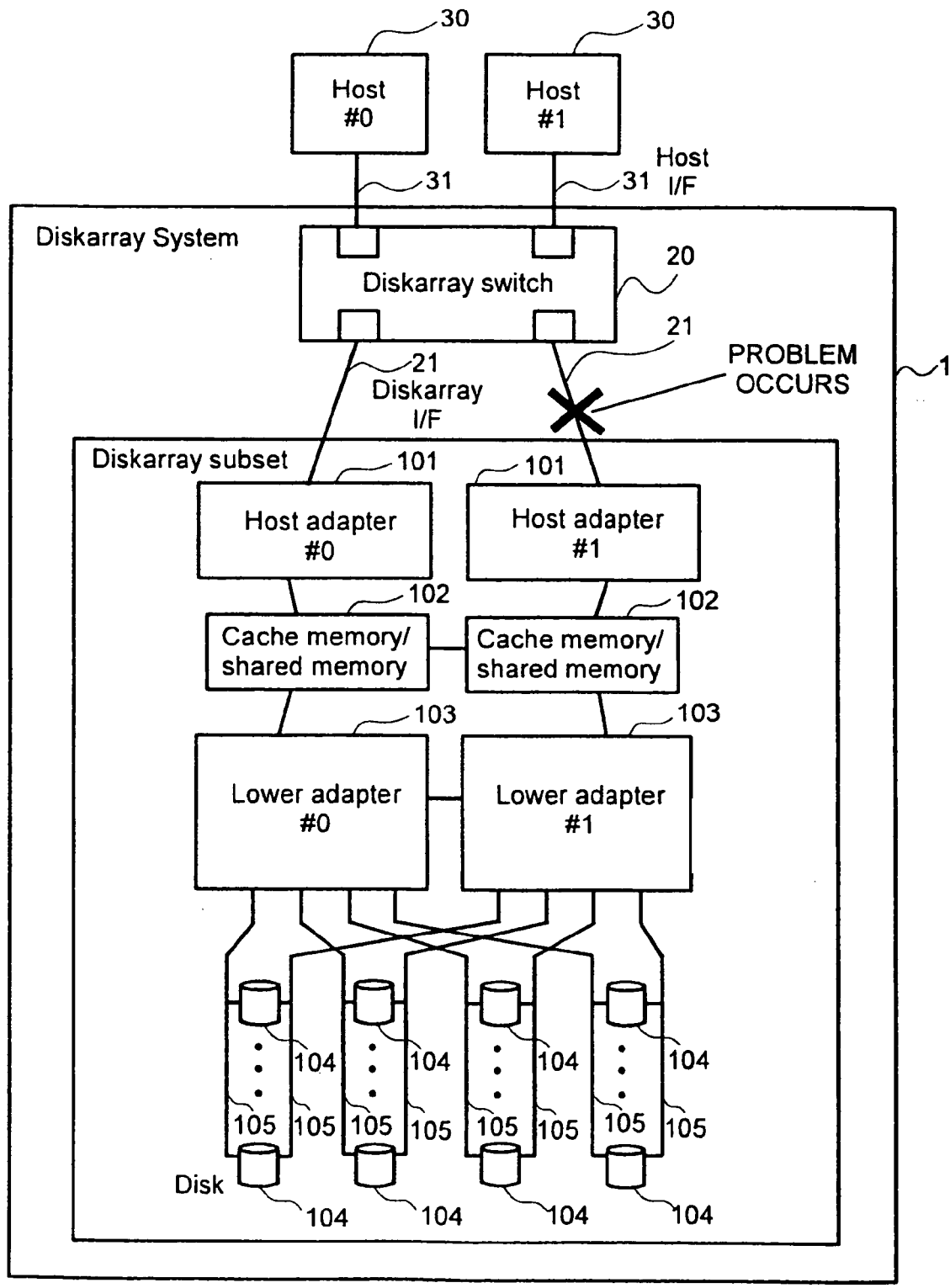
FIG. 24 is a descriptive view of the alternative path setup.

Next, a method for setting alternative paths by means of the diskarray switch 10 is explained while referring to FIG 24. The structure of each section in the computer system shown in FIG. 24 is the same as in the first embodiment. Here, it is assumed that the two hosts 30 are accessing the diskarray subset 10 by utilizing the different diskarray I/F21. The diskarray subsets, the host I/F nodes 203 of the diskarray switch 20 and the diskarray I/F nodes 202 in the figure are shown only in the numbers required for this explanation. The diskarray subset 10 has the same structure as shown in FIG. 2, with two diskarray I/F controllers each connected to one diskarray switch 20. An alternative path for the diskarray I/F21 is set in the DCT227 of each node of the diskarray switch 20. The alternative path is a substitute path to provide access in the event trouble occurs on a particular path.

Here, the alternative path for the diskarray I/F "#0", is set as the diskarray I/F "#1", while the alternative path for the diskarray I/F "#1" is set as the diskarray I/F "#0"1. Alternative paths are set in the same way respectively for the host adapter in the diskarray subset 10, the cache memory/shared memory, and the lower adapter.

Next, the setting of the alternative path is described, assuming that a problem has occurred and the path connecting the diskarray I/F21 to the host adapter "#1" of the diskarray subset 1 is broken or unusable as shown in FIG. 24. At this time, the host "#1" utilizing the diskarray I/F 21 where the problem occurred, is unable to access the diskarray subset 10. The diskarray switch 20 detects an abnormality in the frame transfer with the diskarray subset 10 and when the path cannot be restored after retry processing is implemented, verifies a problem to have occurred on this path. When a problem occurs on the path, the SP2021 registers the information that a problem has occurred in the diskarray I/F "#1" in the DCT2027. Hereafter, the SC2022 of the host I/F node 203 functions to transfer frames from the host "#1" to the diskarray I/F node 202 connected to the diskarray I/F node "#0". The host adapter 101 of the diskarray subset 10 continues the processing of the command from the host "#1". The diskarray switch 20 reports the occurrence of a problem to the diskarray system configuration manager 70, and the occurrence of a problem is then reported to the administrator by means of the diskarray system configuration manager 70.

The embodiment described above, can therefore switch to an alternative path when a problem occurs on a path, without this switch being recognized by the host and render the setting of substitutes on the host side unnecessary. Thus the utilization of the system can be improved.

In this invention as described above, a storage system can be achieved that easily improves the storage device expandability, and reliability according to various requirements and the scale of the computer system. The above explanations of the each of the embodiments all utilized a diskarray system having a disk device. However, this, invention is not limited to use of a disk device as a storage media and is also applicable to optical disk devices, tape devices, DVD devices and semiconductor storage devices, etc.

What is claimed is:

1. A storage system comprising:
   a first storage system including a plurality of first disk drives and a first controller, said first controller managing a plurality of first logical units provided with said plurality of first disk drives in said first storage system;
   a second storage system including a plurality of second disk drives and a second controller, said second controller managing a plurality of second logical units provided with said plurality of second disk drives in said second storage system; and
   a switch, being adapted to be coupled to a host computer, said first storage system and said second storage system, and providing a third logical unit to said host computer, said third logical unit being mapped to both a first logical unit of said plurality of first logical units of said first storage system and a second logical unit of said plurality of second logical units of said second storage system, wherein said third logical unit is displayed as being mapped to both said first storage system and said second storage system on a display of a management computer coupled to said switch, and
   wherein said switch receives a first command to access said third logical unit from said host computer and sends a second command, corresponding to said first command, to at least one of said first logical unit of said first storage system and said second logical unit of said second storage system.

2. The storage system according to claim 1,
   wherein said switch receives said first command including an identifier of said third logical unit, converts the identifier of said third logical unit to an identifier of said first logical unit or an identifier of said second logical unit, and sends said second command, including said identifier of said first logical unit or said identifier of said second logical unit, to said first logical unit of said first storage system or said second logical unit of said second storage system.

3. The storage system according to claim 1,
   wherein a first part of said third logical unit is mapped to said first logical unit, and a second part of said third logical unit is mapped to said second logical unit, and
   wherein said switch receives said first command to access said third logical unit including an address of said first part of said third logical unit, converts the first command to said second command, and sends said second command to said first logical unit.

4. The storage system according to claim 2,
   wherein said switch receives said first command from said host computer via a fiber channel network, and each of said identifiers of said first logical unit, said second logical unit and said third logical unit, is a logical unit number (LUN).

5. A storage system comprising:
   a first storage system including a plurality of first disk drives and a first controller, said first controller managing a plurality of first logical units provided with said plurality of first disk drives in said first storage system;
   a second storage system including a plurality of second disk drives and a second controller, said second controller managing a plurality of second logical units provided with said plurality of second disk drives in said second storage system; and
   a switch, being adapted to be coupled to a host computer, said first storage system and said second storage system, and providing a third logical unit to said host computer, said third logical unit being mapped to both a first logical unit of said plurality of first logical units of said first storage system and a second logical unit of said plurality of second logical units of said second storage system, wherein said third logical unit is shown as being mapped to both said first storage system and said second storage system on a display of a management computer coupled to said switch, and
   wherein, in response to receiving a first command intended to access data in said third logical unit from said host computer, said switch sends a second command, relating to said first command, to at least one of said first logical unit of said first storage system and said second logical unit of said second storage system, which stores said data intended to be accessed by said first command.

6. The storage system according to claim 5,
   wherein said switch has mapping information among said third logical unit, said first logical unit of said first storage system and said second logical unit of said second storage system, receives said first command including an identifier of said third logical unit, converts the identifier of third logical unit to an identifier of said first logical unit or an identifier of said second logical unit according to said mapping information, and sends said second command, including said identifier of said first logical unit or said identifier of said second logical unit, to said at least one of said first logical unit of said first storage system and said second logical unit of said second storage system.

7. The storage system according to claim 6,
   wherein said switch receives said first command from said host computer via a fiber channel network, and each of said identifier's of said first logical unit, said second logical unit and said third logical unit, is a logical unit number (LUN).

8. A method for managing a storage system, wherein the storage system comprises a first storage system including a plurality of first disk drives and a first controller, a second storage system including a plurality of second disk drives and a second controller, a switch and a management computer, the method comprising:
   managing, by the first controller, a plurality of first logical units provided with said plurality of first disk drives in said first storage system;
   managing, by the second controller, a plurality of second logical units provided with said plurality of second disk drives in said second storage system,
   wherein the switch is coupled to a host computer, said first storage system and said second storage system, and provides a third logical unit to said host computer, said third logical unit being mapped to both a first logical unit of said first logical units of said first storage system and a second logical unit of said second logical units of said second storage system; and
   displaying, by said management computer, said third logical unit as being mapped to both said first storage system and said second storage system on a display of said management computer,
   wherein said switch performs steps of:

receiving a first command to access said third logical unit from said host computer; and sending a second command, corresponding to said first command, to at least one of said first logical unit of said first storage system and said second logical unit of said second storage system.

9. The method according to claim 8, wherein said switch further performs steps of:

receiving said first command including an identifier of said third logical unit;

converting the identifier of said third logical unit to an identifier of said first logical unit or an identifier of said second logical unit; and sending said second command, including said identifier of said first logical unit or said identifier of said second logical unit, to said first logical unit in said first storage system or said second logical unit in said second storage system.

10. The method according to claim 8, wherein a first part of said third logical unit is mapped to said first logical unit, and a second part of said third logical unit is mapped to said second logical unit, and wherein said switch performs steps of:

receiving said first command to access said third logical unit including an address of said first part of said third logical unit; and converting said first command to said second command, and sending said second command to said first logical unit.

11. The method according to claim 9, comprising:

receiving, by said switch, said first command from said host computer via a fiber channel network, wherein each of said identifiers of said first logical unit, said second logical unit and said third logical unit, is a logical unit number (LUN).

12. A switch comprising:

a plurality of interface parts being coupled to a host computer, a first storage system and a second storage system, wherein said first storage system includes a plurality of first disk drives and a first controller managing a plurality of first logical units provided with said plurality of first disk drives in said first storage system, and wherein said second storage system includes a plurality of second disk drives and a second controller managing a second logical unit provided with said plurality of second disk drives in said second storage system; and a processor performing a control of said switch, wherein said switch provides a third logical unit to said host computer, said third logical unit being mapped to both a first logical unit of said plurality of first logical units of said first storage system and a second logical unit of said plurality of second logical units of said second storage system, wherein said third logical unit is displayed as being mapped to both said first storage system and said second storage system on a display of a management computer coupled to said switch, and wherein said switch receives a first command to access said third logical unit from said host computer and sends a second command, relating to said first command, to at least one of said first logical unit of said first storage system and said second logical unit of said second storage system.

13. The switch according to claim 12, wherein said switch receives said first command including an identifier of said third logical unit, converts the identifier of said third logical unit to an identifier of said first logical unit or an identifier of said second logical unit, and sends said second command, including said identifier of said first logical unit or said identifier of said second logical unit, to said first logical unit of said first storage system or said second logical unit of said second storage system.

14. The switch according to claim 12, wherein a first part of said third logical unit is mapped to said first logical unit, and a second part of said third logical unit is mapped to said second logical unit, and wherein said switch receives said first command to access said third logical unit including an address of said first part of said third logical unit, converts said first command to said second command, and sends said second command to said first logical unit.

15. The switch according to claim 13, wherein said switch receives said first command from said host computer via a fiber channel network, and each of said identifiers of said first logical unit, said second logical unit and said third logical unit, is a logical unit number (LUN).

\* \* \* \* \*